United States Patent
Sandhu et al.

(10) Patent No.: US 10,255,462 B2
(45) Date of Patent: Apr. 9, 2019

(54) APPARATUS AND METHOD FOR OBFUSCATING POWER CONSUMPTION OF A PROCESSOR

(71) Applicant: ARM Limited, Cambridge (GB)

(72) Inventors: Bal S. Sandhu, Fremont, CA (US); George McNeil Lattimore, Austin, TX (US); Carl Wayne Vineyard, Cedar Park, TX (US)

(73) Assignee: ARM Limited, Cambridge (GB)

( * ) Notice: Subject to any disclaimer, the term of this patent is extended or adjusted under 35 U.S.C. 154(b) by 330 days.

(21) Appl. No.: 15/185,789

(22) Filed: Jun. 17, 2016

(65) Prior Publication Data
US 2017/0364710 A1    Dec. 21, 2017

(51) Int. Cl.
| H04L 29/06 | (2006.01) |
| G06F 21/75 | (2013.01) |
| H04L 9/00  | (2006.01) |
| G09C 1/00  | (2006.01) |

(52) U.S. Cl.
CPC .............. *G06F 21/75* (2013.01); *G09C 1/00* (2013.01); *H04L 9/003* (2013.01); *H04L 2209/125* (2013.01)

(58) Field of Classification Search
CPC ..................................................... G06F 21/75
See application file for complete search history.

(56) References Cited

U.S. PATENT DOCUMENTS

| 4,023,023 A | 5/1977 | Bourrez et al. |
| 4,085,447 A | 4/1978 | Pertl et al. |
| 4,569,016 A | 2/1986 | Hao et al. |
| 4,908,038 A | 3/1990 | Matsumura et al. |
| 4,928,223 A | 5/1990 | Dao et al. |
| 4,949,250 A | 8/1990 | Bhandarkar et al. |
| 5,181,183 A | 1/1993 | Miyazaki |

(Continued)

FOREIGN PATENT DOCUMENTS

| EP | 1688870 A1 | 8/2006 |
| EP | 2285038 A2 | 2/2011 |
| WO | 2016-007501 A1 | 1/2016 |

OTHER PUBLICATIONS

PCT International Search Report and Written Opinion; PCT/GB2017/051681; dated Aug. 7, 2017.

(Continued)

*Primary Examiner* — Shawnchoy Rahman
(74) *Attorney, Agent, or Firm* — Pramudji Law Group PLLC; Ari Pramudji

(57) ABSTRACT

An apparatus for obfuscating power consumption associated with one or more operations of a logic circuitry of a processor. The apparatus comprises counterbalance circuitry configured to provide a second power consumption to directly counterbalance the power consumption associated with the one or more operations of the logic circuitry. The second power consumption varies inversely with the power consumption associated with the one or more operations of the logic circuitry. The apparatus further comprises header circuitry configured to enable a common node to vary in voltage corresponding to the one or more operations of the logic circuitry. The counterbalance circuitry and the header circuitry are each coupled to the logic circuitry at the common node.

19 Claims, 11 Drawing Sheets

(56) References Cited

U.S. PATENT DOCUMENTS

| | | | |
|---|---|---|---|
| 5,404,402 A | 4/1995 | Sprunk | |
| 5,452,401 A | 9/1995 | Lin | |
| 5,471,628 A | 11/1995 | Phillips et al. | |
| 5,499,299 A | 3/1996 | Takenaka et al. | |
| 5,532,578 A * | 7/1996 | Lee | G11C 5/147 |
| | | | 323/313 |
| 5,664,017 A | 9/1997 | Gressel et al. | |
| 5,673,407 A | 9/1997 | Poland et al. | |
| 5,696,937 A | 12/1997 | White et al. | |
| 5,729,554 A | 3/1998 | Weir et al. | |
| 5,748,979 A | 5/1998 | Trimberger | |
| 5,761,523 A | 6/1998 | Wilkinson et al. | |
| 5,768,172 A | 6/1998 | Derby | |
| 5,778,074 A | 7/1998 | Garcken et al. | |
| 5,781,457 A | 7/1998 | Cohen et al. | |
| 5,812,669 A | 9/1998 | Jenkins et al. | |
| 5,819,117 A | 10/1998 | Hansen | |
| 5,838,795 A | 11/1998 | Mittenthal | |
| 5,838,986 A | 11/1998 | Garg et al. | |
| 5,842,027 A | 11/1998 | Oprescu et al. | |
| 5,850,452 A | 12/1998 | Sourgen et al. | |
| 5,941,991 A | 8/1999 | Kageshima | |
| 6,009,450 A | 12/1999 | Dworkin et al. | |
| 6,035,317 A | 3/2000 | Guy | |
| 6,041,122 A | 3/2000 | Graunke et al. | |
| 6,041,403 A | 3/2000 | Parker et al. | |
| 6,049,613 A | 4/2000 | Jakobsson | |
| 6,055,640 A | 4/2000 | Kageshima et al. | |
| 6,064,740 A | 5/2000 | Curiger et al. | |
| 6,067,615 A | 5/2000 | Upton | |
| 6,069,954 A | 5/2000 | Moreau | |
| 6,075,974 A | 6/2000 | Saints et al. | |
| 6,138,229 A | 10/2000 | Kucukcakar et al. | |
| 6,141,421 A | 10/2000 | Takaragi et al. | |
| 6,141,786 A | 10/2000 | Cox et al. | |
| 6,145,077 A | 11/2000 | Sidwell et al. | |
| 6,154,834 A | 11/2000 | Neal et al. | |
| 6,167,524 A | 12/2000 | Goodnow et al. | |
| 6,172,494 B1 | 1/2001 | Feuser | |
| 6,173,408 B1 | 1/2001 | Jimbo et al. | |
| 6,199,087 B1 | 3/2001 | Blake et al. | |
| 6,199,088 B1 | 3/2001 | Weng et al. | |
| 6,205,555 B1 | 3/2001 | Kageshima et al. | |
| 6,219,796 B1 | 4/2001 | Bartley | |
| 6,256,743 B1 | 7/2001 | Lin | |
| 6,278,783 B1 | 8/2001 | Kocher et al. | |
| 6,279,023 B1 | 8/2001 | Weng et al. | |
| 6,295,599 B1 | 9/2001 | Hansen et al. | |
| 6,298,438 B1 | 10/2001 | Thayer et al. | |
| 6,304,658 B1 | 10/2001 | Kocher et al. | |
| 6,327,661 B1 | 12/2001 | Kocher et al. | |
| 6,345,362 B1 | 2/2002 | Bertin et al. | |
| 6,374,085 B1 | 4/2002 | Saints et al. | |
| 6,381,690 B1 | 4/2002 | Lee | |
| 6,430,684 B1 | 8/2002 | Bosshart | |
| 6,480,869 B1 | 11/2002 | Fujioka | |
| 6,510,518 B1 | 1/2003 | Jaffe et al. | |
| 6,535,988 B1 | 3/2003 | Poisner | |
| 6,564,328 B1 | 5/2003 | Grochowski et al. | |
| 6,584,571 B1 | 6/2003 | Fung | |
| 6,594,771 B1 | 7/2003 | Koerber et al. | |
| 6,615,366 B1 | 9/2003 | Grochowski et al. | |
| 6,618,804 B1 | 9/2003 | Steele, Jr. et al. | |
| 6,618,811 B1 | 9/2003 | Berthaud et al. | |
| 6,625,736 B1 | 9/2003 | Berthaud et al. | |
| 6,625,737 B1 | 9/2003 | Kissell | |
| 6,625,740 B1 | 9/2003 | Datar et al. | |
| 6,651,176 B1 | 11/2003 | Soltis, Jr. et al. | |
| 6,654,884 B2 | 11/2003 | Jaffe et al. | |
| 6,715,066 B1 | 3/2004 | Steele, Jr. | |
| 6,952,478 B2 | 10/2005 | Lee et al. | |
| 6,976,178 B1 | 12/2005 | Kissell | |
| 7,318,145 B1 | 1/2008 | Stribaek et al. | |
| 7,599,488 B2 | 10/2009 | Kocher et al. | |
| 7,620,832 B2 | 11/2009 | Kissell | |
| 8,583,944 B1 * | 11/2013 | Trimberger | G06F 11/3058 |
| | | | 380/29 |
| 2003/0172254 A1 | 9/2003 | Mandavilli et al. | |
| 2004/0025032 A1 | 2/2004 | Chow et al. | |
| 2007/0076890 A1 | 4/2007 | Muresan et al. | |
| 2007/0294519 A1 * | 12/2007 | Miller | G06F 9/325 |
| | | | 712/241 |
| 2012/0005466 A1 * | 1/2012 | Wagner | G06F 21/558 |
| | | | 713/2 |
| 2014/0044265 A1 | 2/2014 | Kocher et al. | |

OTHER PUBLICATIONS

Clavier, et al., "Differential Power Analysis in the Presence of Hardware Countermeasures," CHES 200, LNCS 1965, pp. 252-263 (2000).

Shi, Z., and Lee, R.B., "Bit Permutation Instructions for Accelerating Software Cryptography," Proceedings of the IEEE International Conference on Application-specific Systems, Architectures and Processors, pp. 138-148, Boston, MA (Jul. 10-12, 2000).

Dhem, J.-F. and Feyt, N., "Hardware and Software Symbiosis Helps Smart Card Evolution," IEEE Micro 21(6), pp. 14-25 (2001).

Dhem, J.-F. and Feyt, N., "Present and Future Smart Cards," [online]. Gemplus—Card Security Group, pp. 1-9. Retrieved on Oct. 22, 2018 at URL: http://citeseerx.ist.psu.edu/viewdoc/download? doi=10.1.1.535.8002&rep=rep1&type=pdf.

Coron, J.-S. and Goubin, L, "On Boolean and Arithmetic Masking Against Differential Power Analysis," in Proceedings of Second International Workshop on Cryptographic Hardware and Embedded Systems, CHES 2000 (Eds., Ç.K. Koç and C. Paar), Worcester, Massachusetts, USA, Aug. 17-18, 2000, pp. 231-237, Springer-Verlag, Berlin/Heidelberg, Germany (2000).

Hasan, M. A., "Power Analysis Attacks and Algorithmic Approaches to their Countermeasures for Koblitz Curve Cryptosystems," in Proceedings of Second International Workshop on Cryptographic Hardware and Embedded Systems, CHES 2000 (Eds., Ç.K. Koç and C. Paar), Worcester, Massachusetts, USA, Aug. 17-18, 2000, pp. 93-108 Springer-Verlag, Berlin/Heidelberg, Germany (2000).

Kato, T., "A Design for Modular Exponentiation Coprocessor in Mobile Telecommunication Terminals," in Proceedings of Second International Workshop on Cryptographic Hardware and Embedded Systems, CHES 2000 (Eds., Ç.K. Koç and C. Paar), Worcester, Massachusetts, USA, Aug. 17-18, 2000, pp. 216-228, Springer-Verlag, Berlin/Heidelberg, Germany (2000).

Mayer-Sommer, R., "Smartly Analyzing the Simplicity and the Power of Simple Power Analysis on Smartcards," in Proceedings of Second International Workshop on Cryptographic Hardware and Embedded Systems, CHES 2000 (Eds., Ç.K. Koç and C. Paar), Worcester, Massachusetts, USA, Aug. 17-18, 2000, pp. 78-92, Springer-Verlag, Berlin/Heidelberg, Germany (2000).

Naccache, D. and Tunstall, M., "How to Explain Side-Channel Leakage to your Kids," in Proceedings of Second International Workshop on Cryptographic Hardware and Embedded Systems, CHES 2000 (Eds., Ç.K. Koç and C. Saar), Worcester, Massachusetts, USA, Aug. 17-18, 2000, pp. 229-230, Springer-Verlag, Berlin/Heidelberg, Germany (2000).

Shamir, A., "Protecting Smart Cards from Passive Power Analysis with Detached Power Supplies," in Proceedings of Second International Workshop on Cryptographic Hardware and Embedded Systems, CHES 2000 (Eds., Ç.K. Koç and C. Paar), Worcester, Massachusetts, USA, Aug. 17-18, 2000, pp. 216-228, Springer-Verlag, Berlin/Heidelberg, Germany (2000).

Weingart, S. H., "Physical Security Devices for Computer Subsystems," in Proceedings of Second International Workshop on Cryptographic Hardware and Embedded Systems, CHES 2000 (Eds., Ç.K. Koç and C. Paar), Worcester, Massachusetts, USA, Aug. 17-18, 2000, pp. 302-317, Springer-Verlag, Berlin/Heidelberg, Germany (2000).

Daemen, J., et al., "Bitslice Ciphers and Power Analysis Attacks," presented at Fast Software Encryption Workshop 2000, New York, New York, USA, Apr. 10-12, 2000 (16 pages).

Chung, J. W., et al., "Fast Implementation of Elliptic Curve Defined over GF(pm) on CalmRISC with MAC2424 Coprocessor," Ç.K.

(56) References Cited

OTHER PUBLICATIONS

Koç and C. Paar (Eds.): CHES 2000, LNCS 1965, pp. 57-70, 2000.
Shi, Z.J. and Yan, H., "Software Implementations of Elliptic Curve Cryptography," International Journal of Network Security, vol. 7, No. 2, pp. 157-166, Sep. 2008.
Joye, M., et al., "Efficient Generation of Prime Numbers," Ç.K. Koç and C. Paar (Eds.): CHES 2000, LNCS 1965, pp. 340-354, 2000.
Okada, S., et al., "Implementation of Elliptic Curve Cryptographic Coprocessor over GF(2m) on an FPGA," Ç.K. Koç and C. Paar (Eds.): CHES 2000, LNCS 1965, pp. 25-40, 2000.
Orlando, G., et al., "A High-Performance Reconfigurable Elliptic Curve Processor for GF(2m)," Ç.K. Koç and C. Paar (Eds.): CHES 2000, LNCS 1965, pp. 41-56, 2000.
Savas, E., et al., "A Scalable and Unified Multiplier Architecture for Finite Fields GF(p) and GF(2m)," Ç.K. Koçç and C. Paar (Eds.): CHES 2000, LNCS 1965, pp. 277-282 and 284-292, 2000.
Koç, ÇK. and Acar, T., "Montgomery Multiplication in GF (2k)," Proceedings of Third Annual Workshop on Selected Areas in Cryptography, pp. 95-106, Queens University, Kingston, Ontario, Canada, Aug. 15-16, 1996.
Gao, L. et al., "A Compact Fast Variable Key Size Elliptic Curve Cryptosystem Coprocessor," Proceedings of the 7th Annual IEEE Symposium on Field-Programmable Custom Computing Machines, Apr. 21-23, 1999, pp. 304-305.
IEEE Standard for Binary Floating-Point Arithmetic, IEEE, 1985, pp. 1-23.
Koç, Ç.K. and Acar, T., "Fast Software Exponentiation in GF (2k)," Proceedings of the 13th IEEE Symposium on Computer Arithmetic, IEEE, Jul. 6-9, 1997, pp. 225-231.
TMS320Clx/C2x/C2xx/C5x Assembly Language Tools User's Guide, Texas Instruments, Mar. 1995, 483 pages (Bates Nos. L07916-L08398).
Patent Abstracts of Japan, Publication No. JP11203106 (Jul. 30, 1999), English Language Abstract for JP Patent Application No. JP19980005096 (Jan. 13, 1998).
Patent Abstracts of Japan, Publication No. JP4142618 (May 15, 1992), English Language Abstract for JP Patent Application No. JP19900264991 (Oct. 4, 1990).
Patent Abstracts of Japan, Publication No. JP61223938 (Oct. 4, 1986), English Language Abstract for JP Patent Application No. JP19850063782 (Mar. 29, 1985).
Patent Abstracts of Japan, Publication No. JP8314717 (Nov. 29, 1996), English Language Abstract for JP Patent Application No. JP19960146619 (May 16, 1996).
Patent Abstracts of Japan, Publication No. JP2003533829T (Nov. 11, 2003), English Language Abstract for JP Patent Application No. JP20010585439T (May 7, 2001).
Redacted R21 Informal Technical Report, R21-TECH-30-95, titled "Capstone (MYK-80) Specifications (U)", Reportedly obtained from the National Security Agency by FOIA request (Aug. 14, 1995), 23 pages.
Anderson, R., et al., "Tamper Resistance—A Cautionary Note", USENIX Association in the Second USENIX Workshop on Electronic Commerce Proceedings, Oakland, CA, Nov. 18-21, 1996, 12 pages.
Brickell, E. F., et al., "Skipjack Review, Interim Report, The SkipJack Algorithm," Amperif Corporation, Jul. 28, 1993, 7 pages.
Kocher, P., et al., "Differential Power Analysis", Cryptography Research Inc., (1999) 10 pages.
Office Communication, dated Oct. 6, 2004, for U.S. Appl. No. 10/141,579, filed May 9, 2002, 12 pages.
Office Communication, dated Apr. 15, 2005, for U.S. Appl. No. 10/141,579, filed May 9, 2002, 14 pages.
Office Communication, dated Jul. 17, 2006, for U.S. Appl. No. 10/141,579, filed May 9, 2002, 5 pages.
Office Communication, dated Jan. 12, 2007, for U.S. Appl. No. 10/141,579, filed May 9, 2002, 6 pages.
TMS320C5x General-Purpose Applications User's Guide, Texas Instruments, Jul. 1997, 167 pages (Bates Nos. L08399-L08565).

\* cited by examiner

APPARATUS AND METHOD FOR OBFUSCATING POWER CONSUMPTION OF A PROCESSOR

TECHNICAL FIELD

The present technique(s) relate to an apparatus and system for obfuscating the power consumption associated with logic operations of a processor.

BACKGROUND

Modern microprocessors may utilize various logic circuitry to perform various logic operations. These logic operations may include the execution of various instructions carried out by functional blocks of the processor's logic circuitry. The instructions carried out by the processor may be of various types such as data processing instructions, computational instructions, storage instructions, as well as other information instructions. The operations and associated instructions may be carried out sequentially or in parallel and/or may be performed as part of a "pipeline" where multiple instructions are executed at multiple stages of a processor at the same time.

The operations and instructions performed by the processor may be susceptible to monitoring for reverse engineering purposes. For example, the processor may consume an amount of power during the execution of a logic operation and associated instruction. The monitoring of the processor's changing power consumption may enable identification of the logic operation being performed and may enable reverse engineering of code associated with the instruction that was performed.

This problem becomes more significant when the operations and instructions involve steps of a cryptographic algorithm used to secure data and other information. For example, the logic operations and associated instructions performed by a processor may involve steps of a cipher algorithm associated with an encryption standard such as the Advanced Encryption Standard (AES) or the Data Encryption Standard (DES) or a Rivest, Shamir, Aldeman (RSA) cryptosystem. Analysis of a processor's power consumption associated with cryptographic operations/instructions may reveal various cryptographic steps (e.g., steps involving cryptographic "keys") which may result in the compromise of information security.

One such analysis may include the power monitoring techniques of Differential Power Analysis (DPA) that enable the identification of "keys" of cryptographic algorithms associated with various encryption standards. To illustrate, as part of a DPA attack on a processor, power consumptions for different instructions (e.g., cipher instructions) may be estimated and coupled with the monitoring of the processor's power consumption. The DPA attack may reveal the operations/instructions (e.g., cryptographic steps and/or keys) that are executed by functional blocks of the processor.

In traditional cryptographic devices, the possibility of a DPA attack has driven designers to use various techniques to conceal the power consumption required by each instruction and/or round(s) of the chosen cryptographic algorithm. To date, no technique has been discovered that can accurately obscure the power consumption associated with the operations/instructions of a processor as they are being executed. This has resulted in a need to accurate and timely concealment of the operations involved at each stage of the algorithm from a determined attacker.

BRIEF DESCRIPTION OF THE DRAWINGS

The present technique(s) will be described further, by way of example, with reference to embodiments thereof as illustrated in the accompanying drawings. It should be understood, however, that the accompanying drawings illustrate only the various implementations described herein and are not meant to limit the scope of various techniques, methods, systems, or apparatuses described herein.

DETAILED DESCRIPTION

Figure 1:
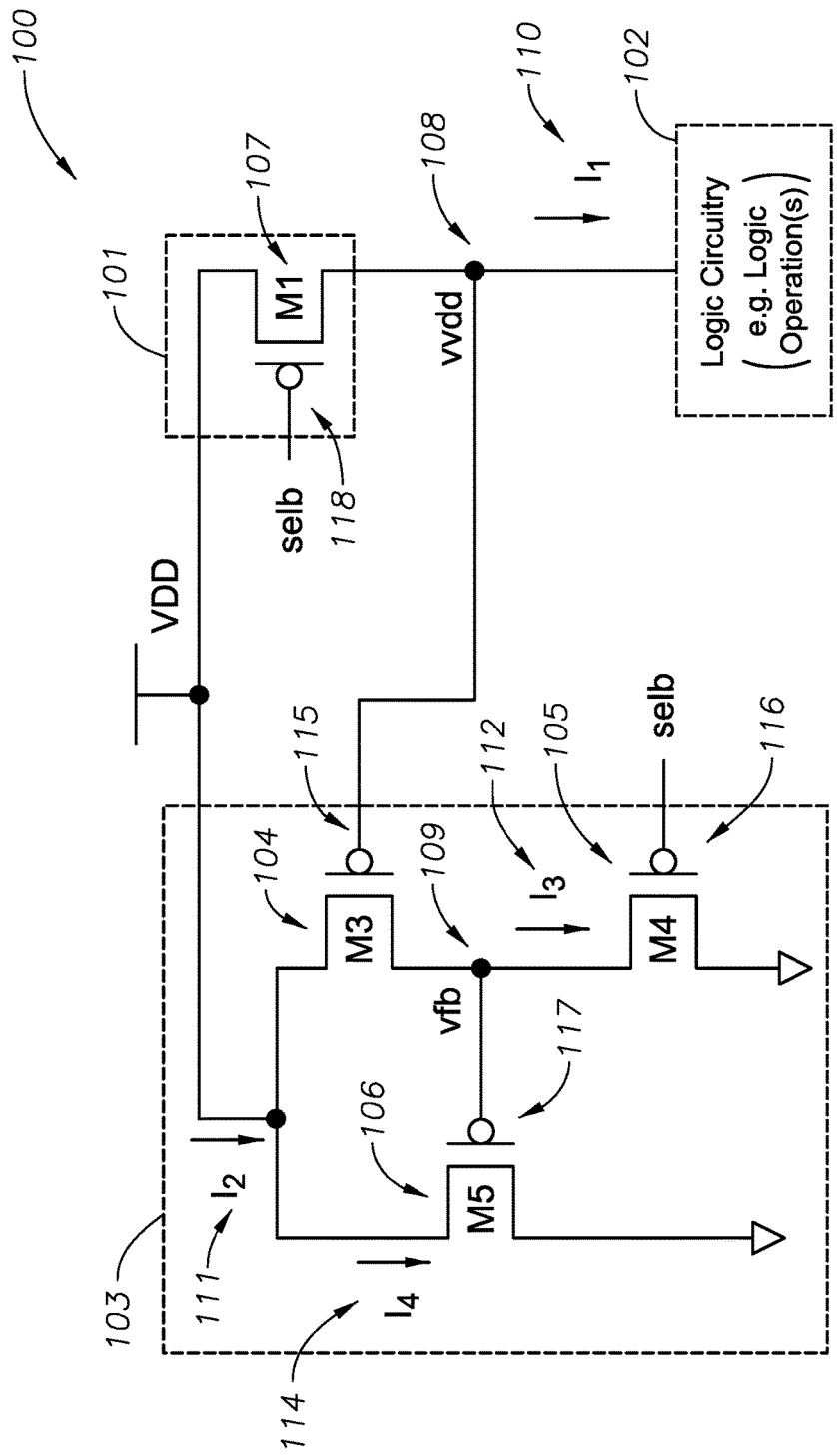
FIG. 1 is a circuit diagram schematically illustrating an apparatus for obfuscating power consumption of a processor in accordance with an embodiment described herein.

Before discussing the embodiments with reference to the accompanying figures, a brief description of various embodiments is provided. In one embodiment, an apparatus for obfuscating a first power consumption associated with one or more operations of a logic circuitry of a processor is described herein. The apparatus includes a counterbalance circuitry configured to provide a second power consumption to directly counterbalance the first power consumption associated with the one or more operations of the logic circuitry. The second power consumption varies inversely with the first power consumption associated with the one or more operations of the logic circuitry. The apparatus further includes header circuitry configured to enable a common node to vary in voltage corresponding to the one or more operations of the logic circuitry. The counterbalance circuitry and the header circuitry are each coupled to the logic circuitry at the common node.

In another embodiment, an apparatus for obfuscating a first power consumption associated with one or more operations of a logic circuitry of a processor is described herein. The apparatus includes a counterbalance circuitry configured to provide a second power consumption to predictively counterbalance the first power consumption associated with the one or more operations of the logic circuitry. The second power consumption varies inversely with the first power consumption associated with the one or more operations of the logic circuitry. The apparatus further includes header circuitry configured to enable the one or more operations of the logic circuitry. The header circuitry and the counterbalance circuitry are configured to receive a selection signal.

In another embodiment, there is provided a system for obfuscating a first power consumption associated with one or more operations of a logic circuitry. The system includes a processor. The processor includes the logic circuitry and a counterbalance circuitry configured to provide a second power consumption to directly counterbalance the first power consumption associated with the one or more operations of the logic circuitry. The second power consumption varies inversely with the first power consumption associated with the one or more operations of the logic circuitry. The processor further includes a header circuitry configured to enable a common node to vary in voltage corresponding to the one or more operations of the logic circuitry. The counterbalance circuitry and the header circuitry are each coupled to the logic circuit at the common node. The system further includes a storage device for storing one or more instructions associated with the one or more operations of the logic circuitry.

In another embodiment, there is provided a system for obfuscating a first power consumption associated with one or more operations of a logic circuitry. The system includes a processor. The processor includes the logic circuitry and a counterbalance circuitry configured to provide a second power consumption to predictively counterbalance the first power consumption associated with the one or more operations of the logic circuitry. The second power consumption varies inversely with the first power consumption associated with the one or more operations of the logic circuitry. The processor further includes a header circuitry configured to enable the one or more operations of the logic circuit. The header circuitry and the counterbalance circuitry are configured to receive a selection signal. The system further includes a storage device for storing one or more instructions associated with the one or more operations of the logic circuitry.

In another embodiment, there is provided a method for obfuscating a first power consumption associated with one or more operations of a logic circuitry of a processor. The method includes selecting header circuitry and counterbalance circuitry associated with the processor. The header circuitry enables one or more operations of the logic circuitry. The method further includes generating a first current corresponding to the first power consumption associated with the one or more operations of the logic circuitry. The method further includes generating a second current corresponding to a second power consumption to directly counterbalance the first power consumption associated with the one or more operations of the logic circuitry. The second power consumption varies inversely with the first power consumption associated with the one or more operations of the logic circuitry. The first current is associated with a common node at which the counterbalance circuitry and the header circuitry are both coupled to the logic circuitry.

In a further embodiment, there is provided a method for obfuscating a first power consumption associated with one or more operations of a logic circuitry of a processor. The method includes selecting header circuitry and counterbalance circuitry associated with the processor. The header circuitry enables one or more operations of the logic circuitry. The method further includes generating a first current corresponding to the first power consumption associated with the one or more operations of the logic circuitry. The method further includes generating a second current corresponding to a second power consumption that predictively counterbalances the first power consumption associated with the one or more operations of the logic circuitry. The second power consumption varies inversely with the first power consumption associated with the one or more operations of the logic circuitry.

A processor may comprise various logical components (e.g., functional blocks) that may each perform specific logic operations with the execution of associated instructions. The performance of each operation and associated instruction may have a corresponding power consumption that contributes to the total power consumption of the processor. Accordingly, as more logic operations are performed, a corresponding increase in power consumption for the processor may occur. The monitoring and analysis of a processor's power consumption (e.g., DPA techniques) may deleteriously reveal the logic operations performed, the instruction code executed, or both. The apparatuses and methods described herein may be integrated with the logic components of a processor to provide for the accurate obscuring of the power consumption associated with the operations/instructions performed by the logic components of the processor.

Such obscuring techniques may improve the security and integrity of data being processed by the processor. Additionally, it would be advantageous to provide techniques to control the timing and activation of the power consumption obfuscation. Such techniques may improve the performance, reliability, and efficiency of the processor when performing either secure or non-secure operations/instructions on data.

For example, in a non-limiting embodiment, an apparatus may comprise header circuitry and counterbalance circuitry configured to be connected to logic circuitry of a processor. As logic operations are performed by the logic circuitry, a corresponding increase or decrease in power consumption of the logic circuitry may occur. The counterbalance circuitry may directly counterbalance the power consumption of the logic circuitry by providing a current and corresponding power consumption that varies inversely with the power consumption of the logic circuitry. In this manner, the apparatus may accurately obscure the power consumption of the logic circuitry of the processor.

In another non-limiting embodiment, an apparatus may comprise header circuitry and counterbalance circuitry configured to receive a selection signal. As logic operations are performed by the logic circuitry, a corresponding increase or decrease in power consumption of the logic circuitry may occur. The counterbalance circuitry may predictively counterbalance the power consumption of the logic circuitry by providing a current and corresponding power consumption that varies inversely with the power consumption of the logic circuitry. In receiving the selection signal, the timing of counterbalancing the power consumption associated with the logic circuitry may be controlled. As such, the counterbalance circuitry may provide a counterbalancing power consumption that may better coincide with the power consumption of the logic circuitry. In this manner, the apparatus may timely obscure the power consumption associated with the logic circuitry of the processor.

In one embodiment, an apparatus for obfuscating power consumption associated with logic circuitry of a processor is provided so as to enable improvements in the security and integrity of data being processed by the processor. In another embodiment, the apparatus may also provide improved performance, reliability, and efficiency of the processor when performing either secure or non-secure operations/instructions on data.

The apparatuses and methods described herein may be applied to process technologies that implement various types of devices such as, but not limited to, planar devices, multi-gate devices (e.g., FinFET devices), or a combination of both. The apparatuses and methods described herein may be process independent such that they may be applied to various process technologies. For example, the apparatuses and methods may be applied to current process technologies and any future process technologies having reduced process geometries and\or that utilize various lithographic techniques (e.g., double patterning technique (DPT).

The apparatuses and methods described herein may be associated with one or more standard cells of a process technology so as to enable the automated design of an integrated circuit (IC) with power consumption obfuscation capability. To illustrate, a standard design flow may provide netlists (e.g., schematic level and/or layout level netlists) that include the apparatuses used for obfuscating the power consumption associated with logic modules of the IC design. Alternatively or in addition, the apparatuses and methods described herein may be associated with of one or more engineering change order (ECO) steps used to make changes to a standard design flow. For example, a standard design flow may be modified utilizing ECO steps to provide modified netlists that include the apparatuses used for obfuscating the power consumption associated with logic modules of the IC design.

Particular embodiments will now be described with reference to the figures.

Referring to FIG. 1, a circuit diagram schematically illustrating an exemplary design of an apparatus for obfuscating the power consumption associated with logic circuitry of a processor is shown and generally designated 100. The apparatus 100 includes a header circuitry 101 connected to a first reference voltage supply (e.g., VDD) and to a logic circuitry 102 that may be associated with the processor. The apparatus 100 also includes a counterbalance circuitry 103 connected to the first reference voltage supply (e.g., VDD) and to a second reference voltage supply (e.g., ground, or VSS). The counterbalance circuitry 103 and the header circuitry 101 may each be connected to the logic circuitry 102 at a common node 108 (e.g., a virtual VDD (vvdd) node).

The header circuitry 101 may comprise a first p-channel metal-oxide-semiconductor (PMOS) transistor 107 (e.g., transistor M1). The first PMOS transistor 107 may be connected to the first reference voltage supply and may be connected to the logic circuitry 102 via the common node 108. The first PMOS transistor 107 may have a gate terminal 118 configured to receive a selection bar (selb) signal from control circuitry (not shown). The selb signal may be an inverse signal of a selection (sel) signal. The header circuitry 101 may be configured to enable the common node 108 to have a voltage that may vary in correspondence to one or more logic operations performed by the logic circuitry 102 of the processor. For example, the first PMOS transistor 107 may receive the selb signal at its gate terminal 118 which may activate the first PMOS transistor 107 to turn "on" and enable a voltage at the common node 108. The activation of the first PMOS transistor 107 may also enable the logic circuitry 102 to perform one or more logic operations. The first PMOS transistor 107 may enable the generation of a first current 110 (e.g., the current $I_1$) that may vary in correspondence to the one or more logic operations performed by the logic circuitry 102. The first current 110 may correspond to a power consumption associated with the one or more logic operations performed by the logic circuitry 102.

The counterbalance circuitry 103 may comprise a second PMOS transistor 104 (e.g., transistor M3), a third PMOS transistor 105 (e.g., transistor M4), and a fourth PMOS transistor 106 (e.g., transistor M5). The counterbalance circuitry 103 may be configured to provide a second power consumption to directly counterbalance the power consumption associated with the one or more logic operations performed by the logic circuitry 102. The second PMOS transistor 104 may be connected to the first reference voltage supply (e.g., VDD) and may be connected to the third PMOS transistor 105 via a first node 109 (e.g., node vfb). The second PMOS transistor 104 may have a gate terminal 115 that is connected to the logic circuitry 102 via the common node 108 (e.g., node vvdd).

The third PMOS transistor 105 may be connected between the first node and the second reference voltage supply (e.g., ground, or VSS) and may have a gate terminal 116 configured to receive the selb signal from control circuitry (not shown). In a particular embodiment, the third PMOS transistor 105 of the counterbalance circuitry 103 and the first PMOS transistor 107 of the header circuitry 101 may both receive the selb signal from control circuitry. In this manner, the counterbalance circuitry 103 and the header circuitry 101 may be controlled by a common selection signal.

In an alternative embodiment, the third PMOS transistor 105 may receive a second selb signal (selb2) that is different from the selb signal. The selb2 signal may be associated with timing control of the third PMOS transistor 105 that may be independent of the control of the header circuitry 101. In this manner, the header circuitry may be controlled by a first selection signal (e.g., the selb signal) and the counterbalance circuitry is controlled by a second selection signal (e.g., the selb2 signal) that is different from the first selection signal. The second PMOS transistor 104 and the third PMOS transistor 105 may be associated with a third current 112 (e.g., the current $I_3$) that is a portion of a second current 111 (e.g., the current $I_2$). The second PMOS transistor 104 and the third PMOS transistor 105 may individually or in combination enable voltage adjustment at the first node 109 so as to increase the accuracy of the second power consumption used to directly counterbalance the power consumption associated with the one or more logic operations performed by the logic circuitry 102.

The fourth PMOS transistor 106 may be connected to the first reference voltage supply (e.g., VDD) and may be connected to the second reference voltage supply (e.g., ground, or VSS). The fourth PMOS transistor 106 may have a gate terminal 117 connected to the first node 109 (vfb) and configured to receive the voltage at the first node 109. The fourth PMOS transistor 106 may be configured to drain a fourth current 114 (e.g., the current $I_4$) and to exhibit a corresponding second power consumption that may be used to counterbalance the power consumption associated with the one or more logic operations performed by the logic circuitry 102.

The apparatus 100 may include transistors having different threshold voltage values. For example, the header circuitry 101 may comprise the first PMOS transistor 107 that is configured to have a threshold voltage that is greater than a threshold voltage of at least one or more PMOS transistors of the counterbalance circuitry 103. As another example, the counterbalance circuitry 103 may comprise the third PMOS transistor 105 that is configured to have a threshold voltage that is greater than either a threshold voltage of the second PMOS transistor 104 or a threshold voltage of the fourth PMOS transistor 106, or both. In a particular embodiment, the apparatus 100 may include transistors that have the same threshold voltage values. For example, the first PMOS transistor 107 may be configured to have a threshold voltage that is the same as a threshold voltage of the third PMOS transistor 105.

To illustrate, the first PMOS transistor 107 of the header circuitry 101 and the third PMOS transistor 105 of the counterbalance circuitry 103 may be configured to have a same threshold voltage, such as a "regular" threshold voltage associated with a process technology. For example, the regular threshold voltage may be an average or normal threshold voltage designated for the process technology. The second PMOS transistor 104 and the fourth PMOS transistor 106 of the counterbalance circuitry 103 may be configured to have a "low" threshold voltage that is less than the "regular" threshold voltage associated with the process technology. In this manner, the third PMOS transistor 105 may be configured to have a threshold voltage that is greater than a threshold voltage of the second PMOS transistor 104 and greater than a threshold voltage of the fourth PMOS transistor 106.

The apparatus 100 may include transistors configured to have different sizes. Transistor "size" may refer to one of several dimensions, W (width) or L (length) of the transistor. The W/L ratio is directly proportional to the current that flows from drain to source in either the linear or saturated modes. This drain to source current is the main component of the active or switching power. In most cases in this application where size ratios are discussed the W, width, is the dimension that is being used. However, there are a few modes in this application that mention "low-power mode, retention mode". In the discussion of these low power mode or retention mode, it is a situation where leakage is being suppressed. In suppressing leakage increasing the channel length can be another aid to reduce leakage in addition to threshold voltage. Where leakage suppression is discussed therefore, both the W and the L sizes are included in the discussion.

Transistors of the apparatus 100 may be configured to have different sized widths resulting in different width ratios. For example, the counterbalance circuitry 103 may have transistors with different sizes such that a size of the second PMOS transistor 104 and a size of the third PMOS transistor 105 may have a ratio of 3 to 1. To illustrate, the size of the second PMOS transistor 104 may be three times the size of the third PMOS transistor 105. Such sizing may enable the first node 109 (vfb) to have a voltage value that is greater than half the first reference voltage supply (e.g., greater than VDD/2). In another example, a size of the fourth PMOS transistor 106 of the counterbalance circuitry 103 and a size of a first PMOS transistor 107 of the header circuitry 101 may have a ratio of 1.5 to 1. In a particular embodiment, the second PMOS transistor 104 and fourth PMOS transistor 106 of the counterbalance circuitry 103 may be sized to provide accurate counterbalancing of the power consumption (e.g., a first power consumption) associated with the one or more operations of the logic circuitry 102.

In another embodiment, the sizing of transistors of the counterbalance circuitry 103 and the header circuitry 101 may be based on the logic operations performed by the logic circuitry 102. For example, the second PMOS transistor 104 and fourth PMOS transistor 106 of the counterbalance circuitry 103 may be sized based on predicted power consumption values associated with the logic circuitry 103. Such sizing may enable the generation of a current (e.g., the fourth current 114) and a corresponding second power consumption which may be used to counterbalance the power consumption of one or more logic operations performed by the logic circuitry 102.

In a particular embodiment, the various sizes of the transistors (e.g., the second PMOS transistor 104 and fourth PMOS transistor 106) of the apparatus 100 may be sized in a custom manner. For example, in a non-limiting embodiment, the fourth PMOS transistor 106 may be sized to provide a counterbalance current (e.g., the fourth current 114) that varies inversely with the first current 110 (e.g., $I_1$). After the fourth PMOS transistor 106 has been sized, a size of the second PMOS transistor 104 and a size of the third PMOS transistor 105 may be adjusted in accordance with the sizing of the fourth PMOS transistor 106 to provide a size ratio that is greater than or equal to a two to one ratio (e.g., a 3 to 1 ratio). In another embodiment, the various sizes of the transistors (e.g., the second PMOS transistor 104 and fourth PMOS transistor 106) of the apparatus 100 may be part of a standard cell library of a process technology to enable automated transistor sizing for automated configuration of the counterbalancing circuitry 103.

The counterbalancing current (e.g., the fourth current 114) may be generated and/or adjusted by the sizing of the second PMOS transistor 104 and the third PMOS transistor 105. To Illustrate, the second PMOS transistor 104 and the third PMOS transistor 105 may be configured to effectively form a voltage divider. The second PMOS transistor 104 and the third PMOS transistor 105 may be sized (e.g., a sizing of 3 to 1) to enable the modulation of a voltage at the first node 109 (vfb). Such modulation of the first node 109 may further modulate the fourth PMOS transistor 106 to generate and/or adjust the counterbalancing current (e.g., the fourth current 114 ($I_4$)). In another embodiment, the counterbalancing current may be generated and/or adjusted by the sizing of the fourth PMOS transistor 106 so as to generate and/or adjust the counterbalancing current to vary inversely with the first current 110 (e.g., $I_1$). Such sizing of transistors of the counterbalance circuitry 103 may enable the generation of a current (e.g., the fourth current 114) and a corresponding second power consumption which may be used to counterbalance the power consumption of one or more logic operations performed by the logic circuitry 102.

The logic circuitry 102 may be associated with one or more functional blocks that perform one or more logic operations. The logic operations performed by the logic circuitry 102 may include, but are not limited to, any number of processor operations, such as data processing operations, arithmetic operations, logical operations, etc. In a particular embodiment, the logic operations may correspond to one or more pipeline steps carried out by the processor. For example, the logic operations may involve various pipeline steps such as instruction fetch steps, instruction decode and register steps, instruction execution steps, memory access steps, and register write steps.

In another embodiment, the logic operations may correspond to one or more stages of a cryptographic algorithm. For example, the logic operations may involve "keyed" cryptographic steps such as, but not limited to, key expansion steps, combination steps, substitution steps, transposition steps, mixing steps, etc. The logic operations may correspond to cryptographic algorithms that are associated with one or more encryption standards. For example, the logic operations may involve instructions and steps related to an Advanced Encryption Standard (AES) or a Data Encryption Standard (DES) or a Rivest, Shamir, Aldeman (RSA) cryptosystem.

The counterbalance circuitry 103 may enable the generation of the second current 111 (e.g., the current $I_2$) that may be comprised of the third current 112 (e.g., the current $I_3$) and the fourth current 114 (e.g., the current $I_4$). In a particular embodiment, the fourth current 114 may have a value that is substantially greater than a value for the third current 112. The second current 111 (e.g., $I_2$) and the first current 110 (e.g., $I_1$) may have the following relationships:

$$I_2 \propto 1/I_1$$

$I_{total} \approx I_1 + I_2$, where $I_{total}$ is the maximum current for the apparatus 100.

The counterbalance circuitry 103 may enable the generation of a current and corresponding power consumption (e.g., a second power consumption) that varies inversely with the power consumption (e.g., a first power consumption) associated with the one or more logic operations performed by the logic circuitry 102. For example, given a maximum current designed for the apparatus 100, the logic circuitry 102 may perform one or more logic operations (and/or associated instructions) utilizing one or more functional blocks which may drain, for example, two thirds of the maximum current and exhibit a corresponding two thirds power consumption of the maximum power consumption. In this case, the counterbalance circuitry 103 may enable the generation of a current that is one third of the maximum current and the counterbalance circuitry 103 may exhibit a corresponding one third power consumption of the maximum power consumption. In this manner, the counterbalance circuitry 103 may provide a counterbalancing power consumption that varies inversely with the power consumption associated with the one or more logic operations performed by the logic circuitry 102.

In a similar manner, if the logic circuitry 102 performs one or more logic operations (and/or associated instructions) utilizing one or more functional blocks to drain, e.g., one third of the maximum current and exhibit a corresponding one third possible power consumption. In this case, the counterbalance circuitry 103 may enable the generation of a current that is two thirds of the maximum current and the counterbalance circuitry 103 may exhibit a corresponding two thirds possible power consumption. In this manner, the counterbalance circuitry 103 may provide counterbalancing power consumption that varies inversely with the power consumption associated with the one or more logic operations performed by the logic circuitry 102. It is to be understood that other power consumption values exhibited by the logic circuitry may be counterbalanced by the counterbalance circuitry 103 in the manner described herein.

During operation, the apparatus 100 may provide a second power consumption that may counterbalance a power consumption associated with operations/instructions carried out by logic circuitry of a processor. For example, the counterbalance circuitry 103 and the header circuitry 101 may each receive the selb signal. The selb signal may have a logical value of 0 and a corresponding "low" voltage value (e.g., voltage value corresponding to ground, VSS, or low voltage source of a process technology). In receiving the selb signal, the first PMOS transistor 107 of the header circuitry 101 and the third PMOS transistor 105 of the counterbalance circuitry 103 may be substantially "on."

While the first PMOS transistor 107 is on, the common node 108 may exhibit a voltage that corresponds to the operation of one or more functional blocks of the logic circuitry 102. Additionally, the first current 110 may exhibit a current that also corresponds to the operation of one or more functional blocks of the logic circuitry 102. For example, in a first case, for a given instance, as the logic circuitry 102 operates additional functional blocks and/or performs additional operations/instructions, the logic circuitry 102 may drain more current such that the first current 110 may increase. The logic circuitry 102 may exhibit a corresponding increase in power consumption, and the common node 108 (e.g., node vvdd) may exhibit a corresponding decrease in voltage. Similarly, in a second case, as the logic circuitry 102 operates fewer functional blocks and/or performs fewer operations/instructions, the logic circuitry 102 may drain less current such that the first current 110 may decrease. The logic circuitry 102 may exhibit a corresponding decrease in power consumption, and the common node 108 may exhibit a corresponding increase in voltage.

During the first case, where the first current 110 may increase and the logic circuitry 102 exhibits a corresponding increase in power consumption, the decreasing voltage at the common node 108 may enable the second PMOS transistor 104 of the counterbalance circuitry 103 to become more strongly "on." While the second PMOS transistor 104 is on, the first node 109 (e.g., node vfb) may exhibit a corresponding increase in voltage that may enable the fourth PMOS transistor 106 to become more strongly "off." This may cause the fourth current 114 to correspondingly decrease for a corresponding decrease in a second power consumption used for counterbalancing the power consumption of the logic circuitry 102. In this manner, as the logic circuitry 102 increases operations/instructions with a corresponding increase in power consumption, the counterbalance circuitry 103 may provide a current (e.g., the current 114) and a corresponding second power consumption that varies inversely with the power consumption of the logic circuitry 102.

Similarly, during the second case, where the first current 110 may decrease and the logic circuitry 102 exhibits a corresponding decrease in power consumption, the increasing voltage at the common node 108 may enable the second PMOS transistor 104 of the counterbalance circuitry 103 to become more strongly "off." While the second PMOS transistor 104 is off, the first node 109 (e.g., node vfb) may exhibit a corresponding decrease in voltage (e.g., the voltage may "float" to ground) which may enable the fourth PMOS transistor 106 to become more strongly "on." This may cause the fourth current 114 to correspondingly increase for a corresponding increase in the second power consumption used for counterbalancing the power consumption of the logic circuitry 102. In this manner, as the logic circuitry decreases operations/instructions with a corresponding decrease in power consumption, the counterbalance circuitry 103 may provide a current (e.g., the current 114) and a corresponding second power consumption that varies inversely with the power consumption of the logic circuitry.

It is to be understood that the connection of the counterbalance circuitry 103 to the logic circuitry 102 via the common node 108 may modulate the activity of the second PMOS transistor 104. Such modulated activity of the second PMOS transistor 104 may provide adjustment of the voltage at the first node 109 (vfb) to enable the modulation of the fourth PMOS transistor 106 and the associated second power consumption generated by the counterbalance circuitry 103. In this way, the coupling of the counterbalance circuitry 103 to the logic circuitry 102 may enable the counterbalance circuitry 103 to provide a second power consumption with an increased accuracy for directly counterbalancing the power consumption associated with the one or more operations of the logic circuitry 102.

Accordingly, as logic operations and power consumption of the logic circuitry 102 increase to approach a maximum power consumption for the apparatus 100, the counterbalance circuitry 103 may provide a second power consumption value that would act to obscure the total power consumption of the logic circuitry and its associated processor. For illustrative purposes, in a non-limiting example, the logic circuitry 102 may perform a logical operation that corresponds to a power consumption that is one-fourth the maximum power consumption available to the apparatus 100. In the manner described herein, the counterbalance circuitry 103 may provide a second power consumption (via an associated current drain) that is three-fourths the maximum power consumption available to the apparatus 100.

As another illustration, if the power consumption of the logic circuitry 102 is half the maximum power consumption available to the apparatus 100, the counterbalance circuitry 103 may provide for a second power consumption that is half the maximum power consumption available to the apparatus 100. Similarly, if the power consumption of the logic circuitry 102 is three-fourths the maximum power consumption available to the apparatus 100, the counterbalance circuitry 103 may provide for a second power consumption that is one-fourth the maximum power consumption available to the apparatus 100. In this manner, the counterbalance circuitry 103 may provide for a second power consumption that varies inversely with a power consumption associated with logical operations performed by logic circuitry 102 of a processor. It is to be understood that the counterbalance circuitry 103 is not limited to the operational examples described herein, but may also provide other inverse values of power consumption within a range of a maximum power consumption available to the apparatus 100.

Accordingly, it is to be understood that although the power consumption of the logic circuitry 102 may have a particular value (e.g., one-fourth the maximum power consumption), the total power consumption associated with the processor may be of a different value (e.g., the maximum power consumption) that results from the combination of the power consumption for the logic circuitry 102 and the second power consumption provided by the counterbalance circuitry 103. In this way, the counterbalance circuitry 103 may provide a second power consumption value that would act to obscure the total power consumption of the logic circuitry and its associated processor.

The apparatus 100 and its obfuscation operations may be associated with other processor modes of operation such as, but not limited to, a secure mode, low-power mode, or other modes of operation for the processor. The obfuscation of the power consumption associated with logic circuitry 102 of a processor may provide improvements in the security and integrity of data, operations, and instructions that are processed. For example, in cases where a processor and the operations/instructions it executes are subject to undesired monitoring/analysis, such as during a DPA attack, the apparatus 100 via the counterbalance circuitry 103 may obscure the power consumption of the processor (e.g., a DPA mode of the apparatus). Such obfuscation may counteract the undesired monitoring/analysis of the processor, its associated operations/instructions and corresponding power consumption to provide improved security of the data and operations (e.g., cryptographic data and/or operations) processed by components of the processor.

Figure 2:
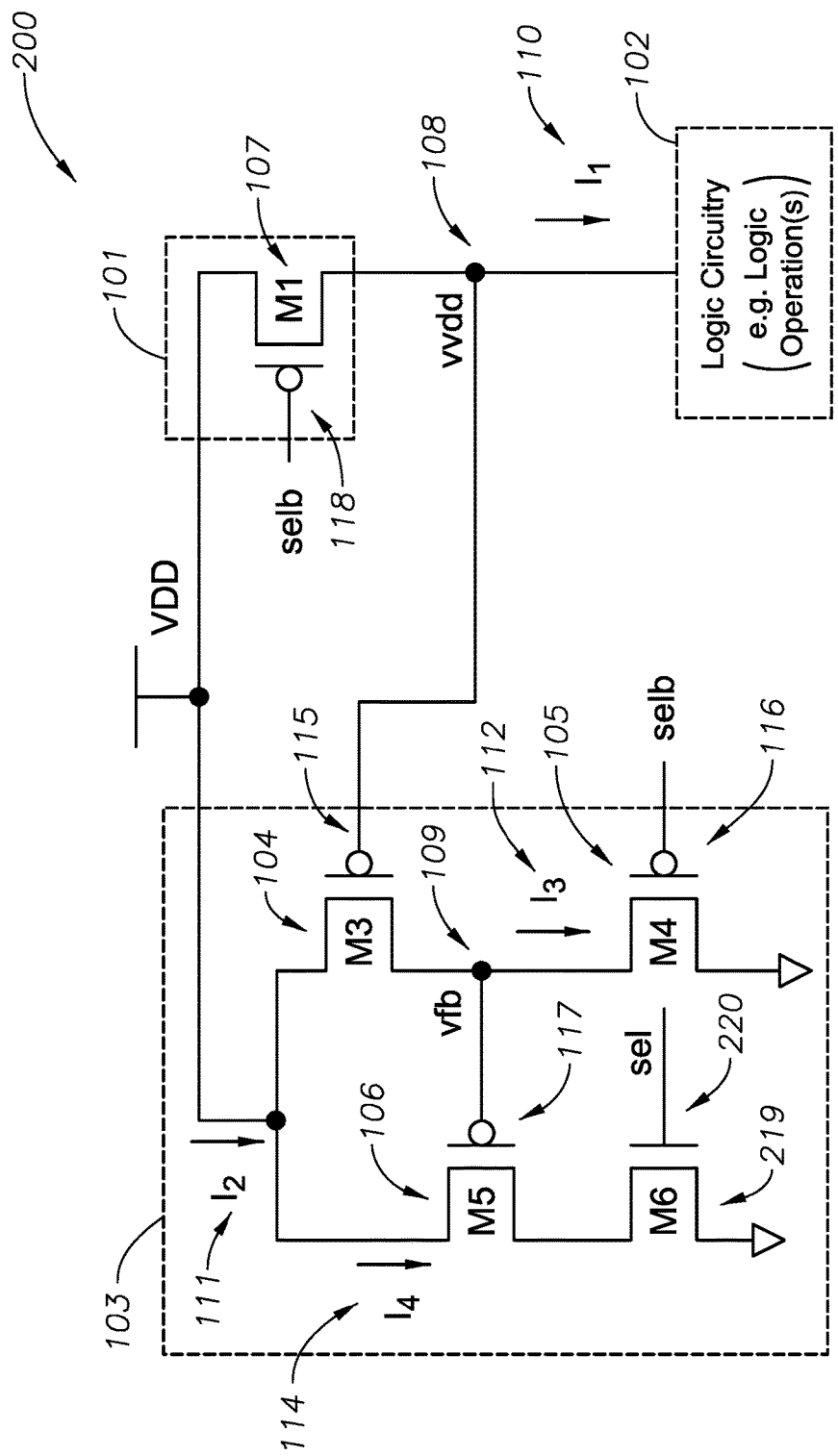
FIG. 2 is a circuit diagram schematically illustrating an apparatus for obfuscating power consumption of a processor in accordance with another embodiment described herein.

Referring to FIG. 2, a circuit diagram schematically illustrating another design of an apparatus for obfuscating the power consumption associated with logic circuitry of a processor is shown and generally designated 200. The apparatus 200 may be substantially similar to the apparatus 100 of FIG. 1 but may include and/or omit other components. For example, in contrast to the apparatus 100 of FIG. 1, the apparatus 200 may have a counterbalance circuitry 103 that includes a first n-channel metal-oxide-semiconductor (NMOS) transistor 219 (e.g., transistor M6). The first NMOS transistor 219 may be connected to a fourth PMOS transistor 106 (e.g., transistor M5) of the counterbalance circuitry 103 and may be connected to a second reference voltage supply (e.g., ground, or VSS). The first NMOS transistor 219 may have a gate terminal 220 configured receive a selection (sel) signal from control circuitry (not shown).

The apparatus 200 may operate in a manner substantially similar to that of the apparatus 100 of FIG. 1 but may include and/or omit other operations. For example, the apparatus 200 may be configured to operate in a low-power mode associated with the processor. To illustrate a particular embodiment, during operation, a gate terminal 118 of a first PMOS transistor 107 of the header circuitry 101 and a gate terminal 116 of a third PMOS transistor 105 of the counterbalance circuitry 103 may receive a selection bar (selb) signal from control circuitry (not shown). In another embodiment, the third PMOS transistor 105 may be controlled by a second selection bar (selb2) signal that is different from the selb signal. The selb2 signal may be associated with timing control of the third PMOS transistor 105 that may be independent of the control of the header circuitry 101.

The selb signal may be an inverse signal of a selection (sel) signal. The selb signal may provide a logical value of 1 (e.g., a corresponding "high" voltage value such as VDD voltage, a voltage greater than a threshold voltage, etc.) to the transistors 105 and 107. The first NMOS transistor 219 may have a gate terminal 220 configured receive the sel signal from the control circuitry (not shown). The sel signal may provide a logical value of 0 corresponding "low" voltage value (e.g., a voltage value corresponding to ground, VSS, or low voltage source of a process technology) to the gate terminal 220 of the first NMOS transistor 219.

Accordingly, the first PMOS transistor 107, the third PMOS transistor 105, and the first NMOS transistor 219 may each be substantially "off." In this case, having the first NMOS transistor 219 in an "off" state may prevent the fourth PMOS transistor 106 from leaking current to a ground terminal. In this manner, less power is consumed by the counterbalance circuitry 103 which may correspond to the apparatus 200 operating in a low-power mode. The low power mode may correspond to a sleep mode associated with the processor. In the case where the first PMOS transistor 107 and the third PMOS transistor 105 are substantially "on" by their receipt of the selb signal providing a logical value of 0, the first NMOS transistor 219 may also be substantially "on" by its receipt of the sel signal providing a logical value of 1. In this manner, the apparatus 200 may provide for the obfuscating of the power consumption associated with the logic circuitry 102 while also providing means for preventing current leakage for a low-power mode associated with the processor. The low-power mode may be associated with instances where logic operations are not performed (e.g., a sleep mode of a processor). In another embodiment, the low power mode may be associated with instances where logic operations are performed and the undesired monitoring/analysis of the processor is not a concern (e.g., a non-DPA mode of operation). In such a case (not shown), the first NMOS transistor 219 and the third PMOS transistor 105 may receive selection signals that are independent of the selection bar (selb) signal received by the first PMOS transistor 107. To illustrate, a selection (sel) signal received by the first NMOS transistor 219 and a second selection bar (selb2) signal received by the third PMOS transistor 105 may both be independent of the selection bar (selb) signal received by the first PMOS transistor 107.

Figure 3:
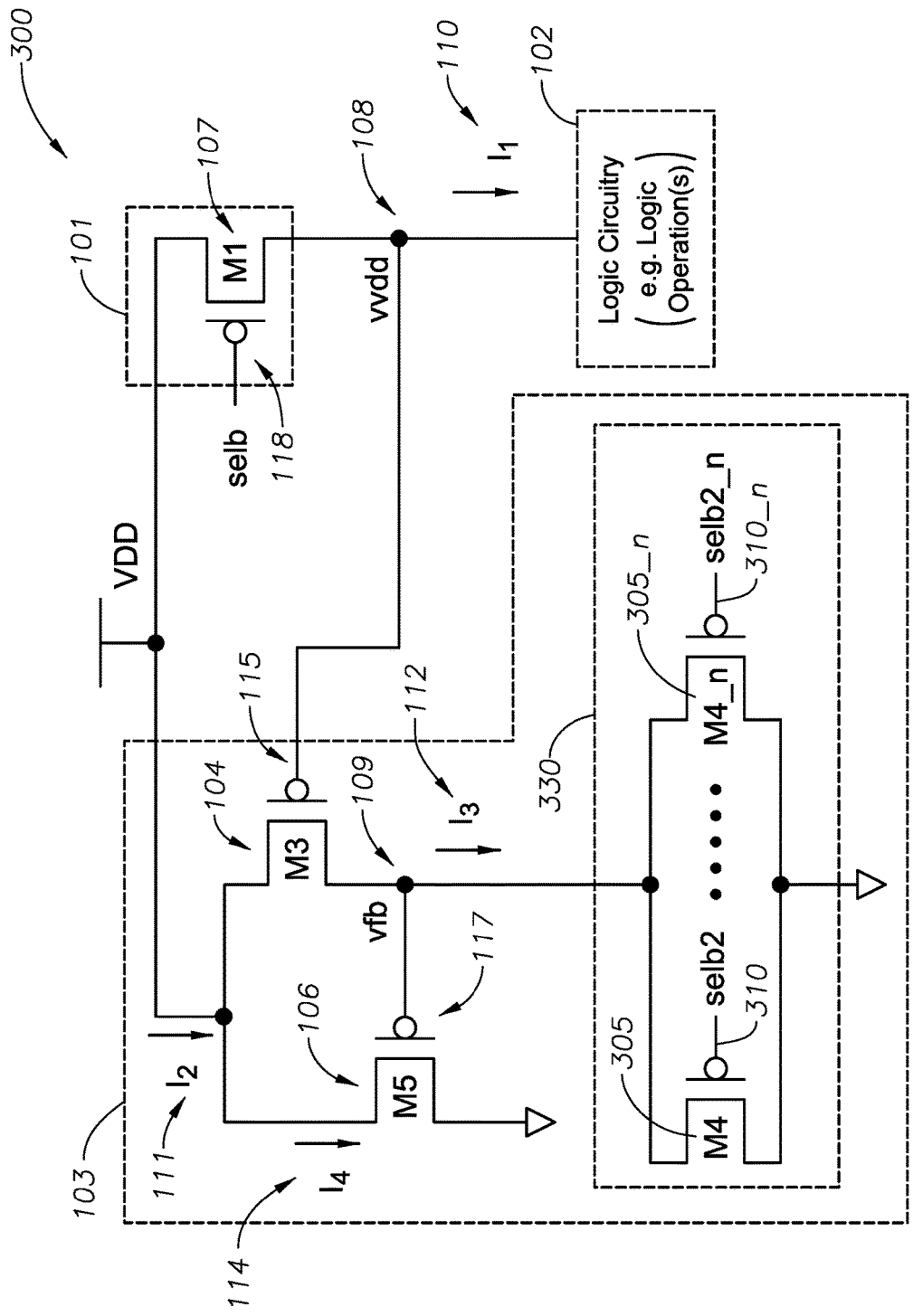
FIG. 3 is a circuit diagram schematically illustrating an apparatus for obfuscating power consumption of a processor in accordance with yet another embodiment described herein.

Referring to FIG. 3, a circuit diagram schematically illustrating yet another design of an apparatus for obfuscating the power consumption associated with logic circuitry of a processor is shown and generally designated 300. The apparatus 300 may be substantially similar to the apparatus 100 of FIG. 1 but may include and/or omit other components. For example, in contrast to the apparatus 100 of FIG. 1, the apparatus 300 may have a counterbalance circuitry 103 that includes a plurality of PMOS transistors 330. The plurality of PMOS transistors 330 may comprise a PMOS transistor 305 (e.g., the transistor M4) and "n" number of other PMOS transistors depicted as 305_n (e.g., an nth transistor M4_n), where "n" is a positive integer.

The plurality of PMOS transistors 330 may be connected in parallel to a first node 109 and to a second reference voltage supply (e.g., ground, or VSS). Each PMOS transistor (e.g., the transistor 305 up to and including the nth transistor 305_n) of the plurality of PMOS transistors 330 may have a gate terminal that is associated with a plurality of gate terminals (e.g., gate terminals 310 up to and including 310_n). The plurality of PMOS transistors 330 may be controlled by a plurality of second selection signals (e.g., the signals selb2 up to and including selb2_n). For example, each PMOS transistor (e.g., the transistor 305 up to and including the nth transistor 305_n) of the plurality of PMOS transistors 330 at its corresponding gate terminal of the plurality of gate terminals (e.g., gate terminals 310 up to and including 310_n) may be configured to receive a second selection bar signal (e.g., selb2 signal) that is associated with a plurality of second selection signals (e.g., the signals selb2 up to and including selb2_n) from a control circuitry (not shown). In a particular embodiment, the plurality of second selection signals may be associated with timing control of the plurality of PMOS transistors 330. This timing control may be independent of the control of the header circuitry 101. In a particular embodiment, the control circuitry associated with the apparatus 300 may be associated with other logic circuitry (e.g., multiplexer and/or demultiplexer circuitry).

The apparatus 300 may operate in a manner substantially similar to that of the apparatus 100 of FIG. 1 but may include and/or omit other operations. For example, the apparatus 300 may be configured to operate in a modulation mode associated with the processor. In a particular embodiment, during operation, the number of PMOS transistors to be active within the plurality of PMOS transistors 330 may depend upon the number of selb2 signals (e.g., the second selection signals selb2 up to and including selb2_n) activated. Activation of selb2 signals may be based on the number of operations to be executed by the logic circuitry 102. In another embodiment, the activation of selb2 signals and the number of corresponding active PMOS transistors of the plurality of PMOS transistors 330 may be based on the current used (or power consumed) by the one or more operations to be executed by the logic circuitry 102. Accordingly, the activation (or de-activation) of individual PMOS transistors within the plurality of PMOS transistors 330 may more accurately modulate the counterbalance circuitry 103 for the provision of a second power consumption to counterbalance the power consumption associated with the operations/instructions executed by the logic circuitry 102. In this manner, the control of the plurality of PMOS transistors 330 by the plurality of second selection signals sent by a control circuitry may enable increased accuracy of the counterbalance circuitry 103 for counterbalancing of a first power consumption associated with one or more operations of the logic circuitry 102. Such modulation may be of significant benefit when associated with operations/instructions that are part of a "pipelining" process of a processor.

As an illustrative example, the activation of one or more PMOS transistors of the plurality of PMOS transistors 330 may drain more current (e.g., the third current 112 ($I_3$)) and may modulate the voltage at the first node 109 (vfb) such that the first node 109 voltage is decreased. Similarly, the de-activation of one or more PMOS transistors of the plurality of PMOS transistors 330 may drain less current (e.g., the third current 112 ($I_3$)) and may increase the voltage at the first node 109 (vfb). In this manner, activated (or deactivated) transistors of the plurality of PMOS transistors 330 may more accurately modulate a fourth PMOS transistor 106 (e.g., M5) to enable more current (e.g., the case of more active M4 transistors) or less current (e.g., the case of fewer active M4 transistors) through the fourth PMOS transistor 106 (e.g., M5). Such modulation may provide a more accurate second power consumption by the counterbalance circuitry 103. Accordingly, for counterbalancing purposes, the counterbalance circuitry 103 may provide the second power consumption that varies inversely with a power consumption associated with logical operations performed by logic circuitry 102.

Figure 4:
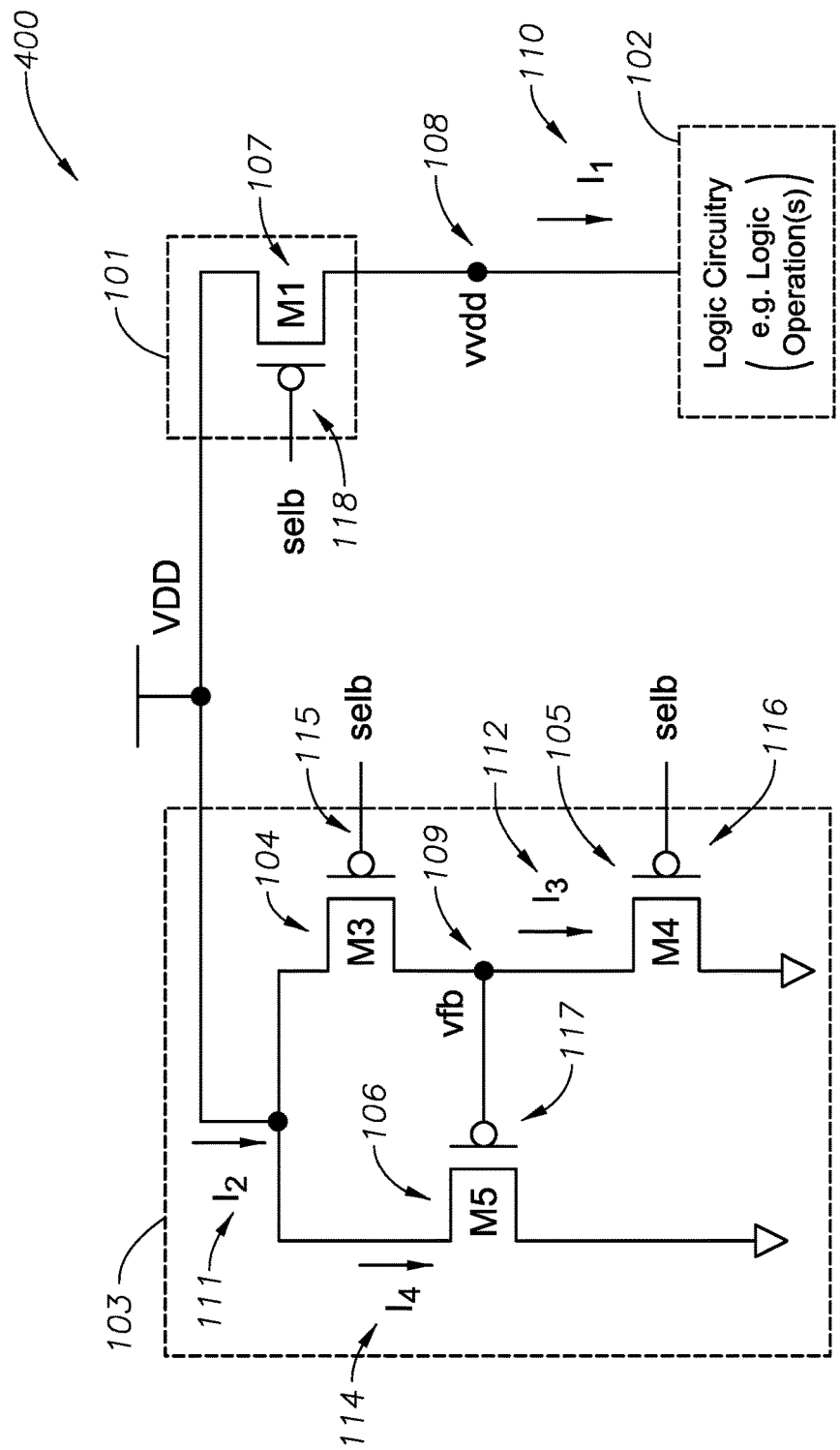
FIG. 4 is a circuit diagram schematically illustrating an apparatus for obfuscating power consumption of a processor in accordance with yet another embodiment described herein.

Referring to FIG. 4, a circuit diagram schematically illustrating another design of an apparatus for obfuscating the power consumption associated with logic circuitry of a processor is shown and generally designated 400. The apparatus 400 may be substantially similar to the apparatus 100 of FIG. 1 but may omit other components to enable operation in a similar but distinctive manner as that of the apparatus 100 of FIG. 1. For example, in contrast to the apparatus 100 of FIG. 1, the apparatus 400 may have a counterbalance circuitry 103 that is not connected to a logic circuitry 102 at a common node 108 (vvdd). The apparatus 400 may have a counterbalance circuitry 103 comprising a second PMOS transistor 104 (e.g., transistor M3), a third PMOS transistor 105 (e.g., transistor M4), and a fourth PMOS transistor 106 (e.g., transistor M5). A gate terminal 118 of a first PMOS transistor 107, a gate terminal 115 of the second PMOS transistor 104, and a gate terminal 116 of the third PMOS transistor 105 may be configured to receive a selb signal from control circuitry (not shown). The apparatus 400 may have header circuitry 101 configured to enable one or more operations of the logic circuitry 102. The header circuitry 101 and the counterbalance circuitry 103 may be configured to receive a selection signal (e.g., a selb signal, or other selection signal).

The apparatus 400 may include transistors having different threshold voltage values and different transistor sizes in a manner substantially similar to that of the apparatus 100 of FIG. 1. For example, the second PMOS transistor 104 and the fourth PMOS transistor 106 of the counterbalance circuitry 103 may be configured to have a "low" threshold voltage associated with the process technology. In another example, a size of the second PMOS transistor 104 and a size of the third PMOS transistor 105 may have a ratio of 5 to 1. In a particular embodiment, the second PMOS transistor 104 and the fourth PMOS transistor 106 may be sized to provide a second power consumption. To illustrate, the second PMOS transistor 104 and the fourth PMOS transistor 106 may be sized to enable the generation of a fourth current 114 (e.g., the current $I_4$) that may correspond to a current drain predicted for operations of the logic circuitry 102. In this manner, the counterbalance circuitry 103 of the apparatus 400 may be configured to provide a second power consumption to predictively counterbalance a power consumption associated with the one or more operations of the logic circuitry 102. The second power consumption provided by the counterbalance circuitry 103 may vary inversely with the power consumption associated with the one or more operations of the logic circuitry 102.

Transistors of the apparatus 400 may be sized based on characteristics of the logic circuitry 102. For example, in a particular embodiment, the second PMOS transistor 104, the third PMOS transistor 105, and the fourth PMOS transistor 106 may be sized based on estimates (e.g., power consumption value estimates) of a power consumption associated with one or more operations (or functional blocks) of the logic circuitry 102. In another embodiment, the second PMOS transistor 104 and the fourth PMOS transistor 106 may be sized based on design parameters of the functional blocks of the logic circuitry 102. In yet another embodiment, the second PMOS transistor 104 and the fourth PMOS transistor 106 may be sized based on predetermined power consumption values of the functional blocks of the logic circuitry 102. In another embodiment, the various sizes of the transistors of the apparatus 400 may be part of a standard cell library of a process technology. In a particular embodiment, the power consumption estimates may be accessed and stored locally from the processor associated with the logic circuitry 102. In another embodiment, the power consumption estimates may be accessed and stored from another device. In yet another embodiment, the access and storage of the power consumption estimates may be in the form of one or more look up tables associated with the processor or other device.

The transistors of the apparatus 400 may be configured to receive one or more selection signals form a control circuitry (not shown). The one or more selection signals may provide timing control of a second power consumption generated by the apparatus 400. To illustrate a particular embodiment, during operation, a gate terminal 118 of a first PMOS transistor 107 of the header circuitry 101, a gate terminal 115 of a second PMOS transistor 104, and a gate terminal 116 of a third PMOS transistor 105 of the counterbalance circuitry 103 may each receive a selection bar (selb) signal from the control circuitry. In another embodiment, the third PMOS transistor 105 may be controlled by a second selection bar (selb2) signal that is different from the selb signal. The selb2 signal may be associated with timing control of the third PMOS transistor 105 (e.g., control of counterbalance circuitry 103) that may be independent of the control of the header circuitry 101. In another embodiment, the selb2 signal may be associated with a plurality of PMOS transistors (e.g., which may include the third PMOS transistor 105) connected in parallel between the second PMOS transistor 104 and a second reference voltage supply (e.g., ground, or VSS). In another embodiment, the third PMOS transistor 105 may be controlled by a third selection bar (selb3) signal that may be different from the selb and/or the selb2 signals.

The apparatus 400 may operate in a manner substantially similar to but distinctive from the apparatus 100 of FIG. 1. For example, the apparatus 400 may be configured to provide a second power consumption to predictively counterbalance the power consumption associated with logic circuitry while enabling control of the timing and activation of the predictive counterbalancing. To illustrate a basic embodiment of the apparatus 400, during operation a gate terminal 118 of a first PMOS transistor 107 of the header circuitry 101, a gate terminal 115 of a second PMOS transistor 104, and a gate terminal 116 of a third PMOS transistor 105 of the counterbalance circuitry 103 may each receive a selection bar (selb) signal from control circuitry. The selb signal may have a logical value of 0 and a corresponding "low" voltage value (e.g., voltage value corresponding to ground, VSS, or low voltage source of a process technology). In receiving the selb signal, the first PMOS transistor 107, the second PMOS transistor 104, and the third PMOS transistor 105 may be substantially "on."

While the first PMOS transistor 107 is on, the common node 108 may exhibit a voltage that corresponds to the operations of functional blocks of the logic circuitry 102. Additionally, a first current 110 may exhibit a current that also corresponds to the operations of the functional blocks of the logic circuitry 102. For example, for a given instance, as logic circuitry 102 operates multiple functional blocks to perform operations/instructions, the logic circuitry 102 may drain the first current 110 and exhibit a power consumption corresponding to the multiple functional blocks.

While the second PMOS transistor 104 and the third PMOS transistor 105 are on, a first node 109 (e.g., node vfb) may exhibit a voltage that may enable a fourth PMOS transistor 106 to become marginally "on" and causing a decreased fourth current 114 (e.g., the current $I_4$) to be generated. When the second PMOS transistor 104 and the fourth PMOS transistor 106 are sized corresponding to a current drain predicted for operations of the logic circuitry 102, the generated fourth current 114 may correspond to a second power consumption that can predictively counterbalance the power consumption associated with operations of the logic circuitry 102. The second power consumption may vary inversely with the power consumption of the logic circuitry 102. In the case where the logic circuitry 102 may utilize fewer functional blocks for fewer performed operations/instructions, a second power consumption for predictive counterbalancing may be provided by a counterbalance circuitry 103 comprised of a plurality of sub-counterbalance circuits, as further described with reference to FIG. 5.

In a particular embodiment, the apparatus 400 may be configured to operate utilizing a third selection bar signal (selb3) having a voltage that varies based on the operations/instructions performed by the logic circuitry 102. In this manner, the apparatus 400 may provide a counterbalancing power consumption that can predictively counterbalance the power consumption associated one or more operations of a logic circuitry 102 of a processor. For example, control circuitry may provide the selb3 signal to the gate terminal 115 of the second PMOS transistor 104. The selb3 signal may have a voltage that varies based on the operations/instruction of a logic circuitry 102. In this manner, the selb3 signal may modulate the activity of the second PMOS transistor 104 to further modulate the activity of the fourth PMOS transistor 106 for the generation of a corresponding counterbalancing power consumption.

To illustrate, during a first case, the logic circuitry 102 may perform multiple operations/instructions having a corresponding power consumption. Based on the number or types of operations/instructions or based on the estimated power consumption associated with each operation/instruction, the selb3 signal may provide a voltage whose value decreases based on the logic circuitry 102 performing more operations/instructions (e.g., increases power consumption). The decreased selb3 voltage (based on increased logic operations) provided to the second PMOS transistor 104 may modulate the fourth PMOS transistor 106 to be less "on" so as to provide a smaller counterbalancing power consumption for predictive counterbalancing purposes.

Similarly, in a second case, the logic circuitry 102 may perform fewer operations/instructions having a corresponding lower power consumption. Based on the fewer numbers or types of operations/instructions or based on the lower estimated power consumption associated with the fewer operations/instructions, the selb3 signal may provide a voltage whose value increases based on the logic circuitry 102 performing fewer operations/instructions (e.g., decreases power consumption). The increased selb3 voltage (based on decreased logic operations) provided to the second PMOS transistor 104 may modulate the fourth PMOS transistor 106 to be more "on" so as to provide a larger counterbalancing power consumption for predictive counterbalancing purposes. In a particular embodiment, the second PMOS transistor 104 and the fourth PMOS transistor 106 may be sized based on a predicted maximum current drain for the logic circuitry 102 (e.g., a maximum power consumption associated with the logic circuitry 102) or may be based upon other conditions/parameters (e.g., power consumption estimates for one or more functional blocks of the logic circuitry 102). In this manner, the apparatus 400 may provide a power consumption to predictively counterbalance the power consumption associated with operations/instructions of a logic circuitry 102.

The logic circuitry 102 may be associated with one or more functional blocks or logic operations/instructions. These operations may include, but are not limited to, any number of processor operations (e.g., data processing, arithmetic, and/or logical operations). In a particular embodiment, the logic operations may correspond to one or more pipeline steps carried out by the processor. In other embodiments, the logic operations may correspond to one or more stages of a cryptographic algorithm, one or more "keyed" cryptographic steps, or cryptographic algorithms associated with one or more encryption standards (e.g. AES, DES, or RSA standards).

The apparatus 400 may be configured to operate in other modes of operation as described herein, such as but not limited to the low-power mode described with reference to FIG. 2, any retention modes, or other modes of operation describe herein. Furthermore, the apparatus 400 (and its components) may be configured to enable control of timing and activation of the predictive counterbalancing provided by the counterbalancing circuitry 103. For example, by utilizing selection signals (e.g., selb, selb2 and/or selb3 signals), the apparatus 400 and its counterbalancing circuitry 103 may be controlled so as to provide the second power consumption for counterbalancing prior to or concurrently with performance of the operations/instruction of the logic circuitry 102. To illustrate a particular example, the logic circuitry 102 may perform operations/instructions associated with a "pipeline" process of a processor. Control circuitry associated with the apparatus 400 may determine operations/instructions of the pipeline that have yet to be performed and based on the determination may adjust the timing of selection signals sent to the apparatus 400 which may affect the timing of providing the second power consumption for counterbalancing. In this way, the apparatus 400 may be configured to enable the control of timing and activation of the second power consumption for counterbalancing (e.g., power consumption obfuscation) the power consumption associated with the logic circuitry 102. Such control of the counterbalancing provided by the apparatus 400, may improve processor performance during the obfuscation of power consumption associated with encryption or non-encryption operations/instructions of logic circuitry.

To illustrate another example, the logic circuitry 102 of the apparatus 400 may perform operations/instructions associated with a "pipeline" process of a processor. Control circuitry associated with the apparatus 400 may determine operations/instructions of the pipeline process that have yet to be performed. Based on predicted power consumption values associated with the determine operations/instructions, a power consumption required for a next clock cycle of the pipeline process may be predicted. In a particular embodiment, the predictive power consumption values may be based on power consumption estimates for various processor operations/instructions. Accordingly, the apparatus 400 aware of the power consumption required for the next clock cycle, may provide a more timely and more accurate counterbalancing power consumption. In this manner, the apparatus 400 may be configured to provide a faster counterbalancing power consumption with improved accuracy and timing to counterbalance (e.g., power consumption obfuscation) the power consumption associated with the logic circuitry 102.

Figure 5:
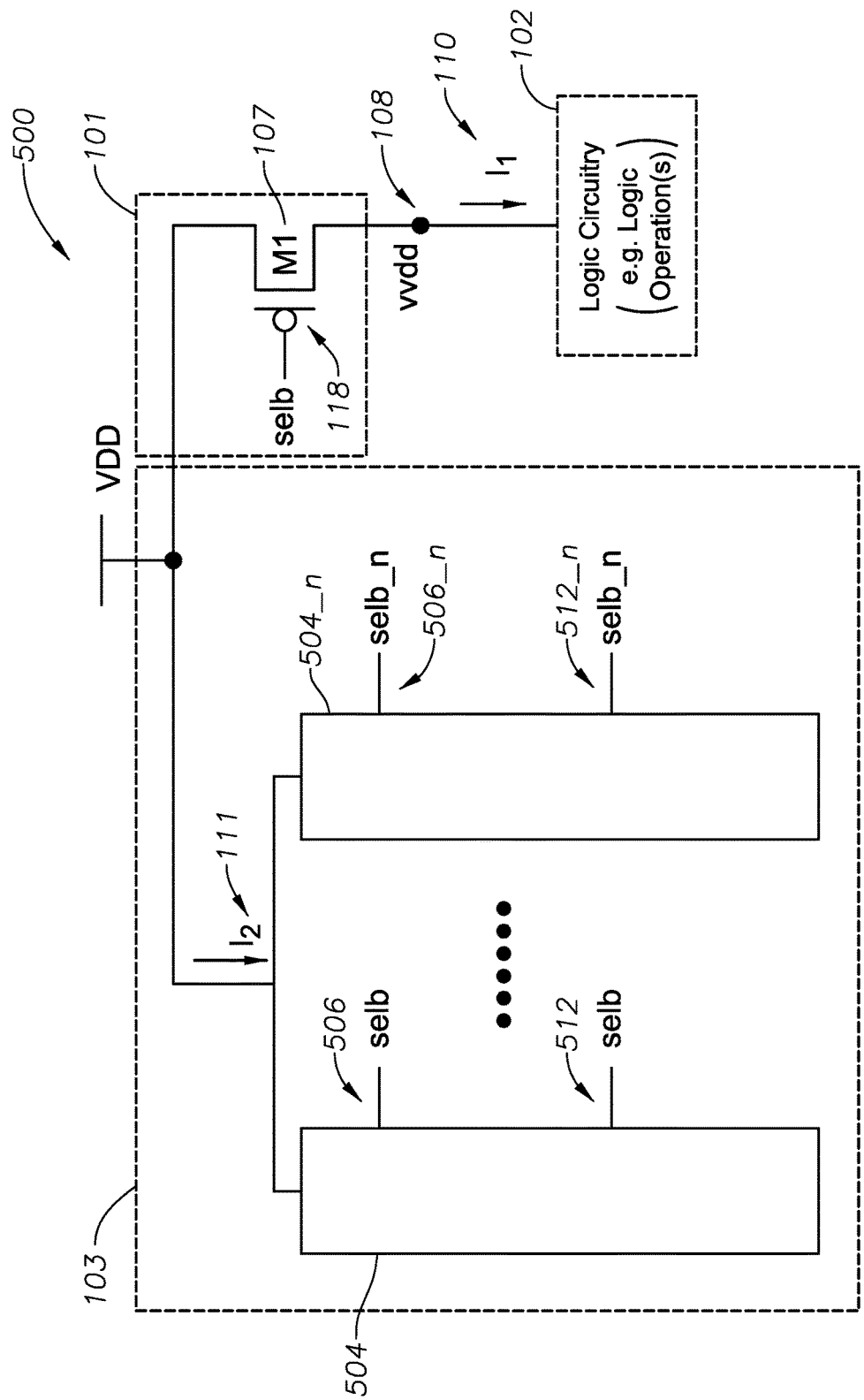
FIG. 5 is a circuit diagram schematically illustrating an apparatus for obfuscating power consumption of a processor in accordance with yet another embodiment described herein.

Referring to FIG. 5, a circuit diagram schematically illustrating another design of an apparatus for obfuscating the power consumption associated with logic circuitry of a processor is shown and generally designated 500. The apparatus 500 may be substantially similar to the apparatus 100 of FIG. 1 and/or the apparatus 400 of FIG. 4 but may include and/or omit other components to enable operation in a similar manner as that of the apparatus 400 of FIG. 4. For example, the apparatus 500 may have a counterbalance circuitry 103 that is not connected to a logic circuitry 102 at a common node 108 (vvdd). The counterbalance circuitry 103 may comprise a plurality of sub-counterbalance circuits that include the sub-counterbalance circuit 504 and "n" number of other sub-counterbalance circuits depicted as 504_n, where "n" is a positive integer.

The plurality of sub-counterbalance circuits (e.g., 504 up to and including 504_n) may be connected in parallel between a first reference voltage supply (e.g., VDD) and a second reference voltage supply (e.g., ground, or VSS). Each sub-counterbalance circuit of the plurality of sub-counterbalance circuits (504 to 504_n) may comprise the counterbalance circuitry 103 of FIG. 4. The plurality of sub-counterbalance circuits (e.g., 504 up to and including 504_n) may be configured to receive one or more selection signals (e.g., the selb signals: selb up to and including selb_n) from control circuitry (not shown). For example, the one or more selection signals may activate or de-activate one or more sub-counterbalance circuits of the plurality of sub-counterbalance circuits. To illustrate a particular example, the sub-counterbalance circuit 504 may receive the selb signal at gate terminals 506 and 512 (e.g., the gate terminals 115 and 116 of FIG. 4) corresponding to a second PMOS (e.g., PMOS 104) and a third PMOS transistor (e.g., PMOS 105). In a similar manner, other sub-counterbalance circuits 504_n may receive other selb signals (e.g., selb_n) at their respective gate terminals (e.g., gate terminals 506_n and 512_n) corresponding to their respective transistors (e.g., the second PMOS 104 and the third PMOS transistor 105).

The apparatus 500 may operate in ways substantially similar to that of the apparatus 400 of FIG. 4 but may include and/or omit other operations. For example, the apparatus 500 may provide a counterbalancing power consumption to predictively counterbalance a power consumption associated with one or more operations/instructions of the logic circuitry 102. To illustrate, the apparatus 500 may be configured to provide a second power consumption to predictively counterbalance the power consumption associated with logical operations/instructions performed by logic circuitry 102. In a particular embodiment, the operations/instructions may be part of a "pipelining" process of a processor. In another embodiment, during operation, the number of sub-counterbalance circuits (e.g., 504 up to and including 504_n) to be active/de-active within the counterbalance circuitry 103 may depend upon the number of selb signals (e.g., selb up to and including selb_n) activated or de-activated. Activation/de-activation of selb signals may be based on the number of operations to be executed by the logic circuitry 102. In another embodiment, the activation/de-activation of selb signals and the number of corresponding active/de-active sub-counterbalance circuits (e.g., 504 up to and including 504_n) may be based on the current used (or power consumed) by the one or more operations to be executed by the logic circuitry 102. In these ways, the activation (or de-activation) of the plurality of sub-counterbalance circuits (e.g., 504 up to and including 504_n) may determine the second power consumption to be generated to counterbalance the power consumption associated with the operations/instructions executed by the logic circuitry 102. In a particular embodiment, logical operations/instructions of a logic circuitry 102 may be determined and associated power consumption for a next clock cycle of the pipeline process may be predicted. Activation/de-activation of selb signals may be based on the predicted power consumption to enable the predictive counterbalancing of power consumption associated with the logic circuitry 102.

To illustrate a non-limiting example, in the case where the logic circuitry 102 may utilize fewer functional blocks and/or perform fewer operations/instructions with an associated decreasing power consumption, control circuitry may predictively provide multiple selb signals (e.g., selb up to and including selb_n) to activate multiple corresponding sub-counterbalance circuits (e.g., 504 up to and including 504_n). The activation of multiple sub-counterbalance circuits may provide an increasing second power consumption for counterbalancing the power consumption of the logic circuitry 102. In the case where the logic circuitry 102 may utilize more functional blocks and/or perform more operations/instructions with an associated increasing power consumption, the control circuitry may predictively provide fewer selb signals to activate fewer corresponding sub-counterbalance circuits (e.g., 504 up to and including 504_n). The activation of fewer sub-counterbalance circuits of the counterbalancing circuit 103 may provide a decreasing second power consumption for counterbalancing the power consumption of the logic circuitry 102. In this manner, the activation (or de-activation) of the plurality of sub-counterbalance circuits (e.g., 504 up to and including 504_n) may determine the second power consumption to be generated to predictively counterbalance the power consumption associated with the operations/instructions executed by the logic circuitry 102. Accordingly, the second power consumption may vary inversely with the power consumption associated with the operations performed by logic circuitry 102.

In a manner similar to that of the apparatus 100 FIG. 1 and/or the apparatus 400 FIG. 4, the apparatus 500 may include transistors having different threshold voltage values and/or different transistor sizes. For example, the second PMOS transistor 104 and the fourth PMOS transistor 106 of one or more respective sub-counterbalancing circuits may be sized based on power consumption estimates, design parameters, or predetermined power consumption values associated with one or more functional blocks of the logic circuitry 102. Power consumption estimates may be accessed and stored locally or remotely and may be associated with one or more a look up tables associated with the processor.

Additionally, the apparatus 500 may be configured to operate in other modes of operation as described herein, such as but not limited to, the low-power mode described with reference to FIG. 2, any retention modes, or other modes of operation describe herein. Furthermore, the apparatus 500 may be configured to enable control of timing and activation of the predictive power consumption counterbalancing by utilizing selection signals (e.g., selb, selb2 and/or selb3 signals) in ways similar that described for the apparatus 400 of FIG. 4. Such control may enable the apparatus 500 to provide the counterbalancing power consumption prior to or concurrently with performance of the operations/instruction of the logic circuitry 102 and in ways similar to that described for the apparatus 400 of FIG. 4. In a particular embodiment, control circuitry associated with the apparatus 500 may be associated with other logic circuitry (e.g., multiplexer and/or demultiplexer circuitry).

Figure 6:
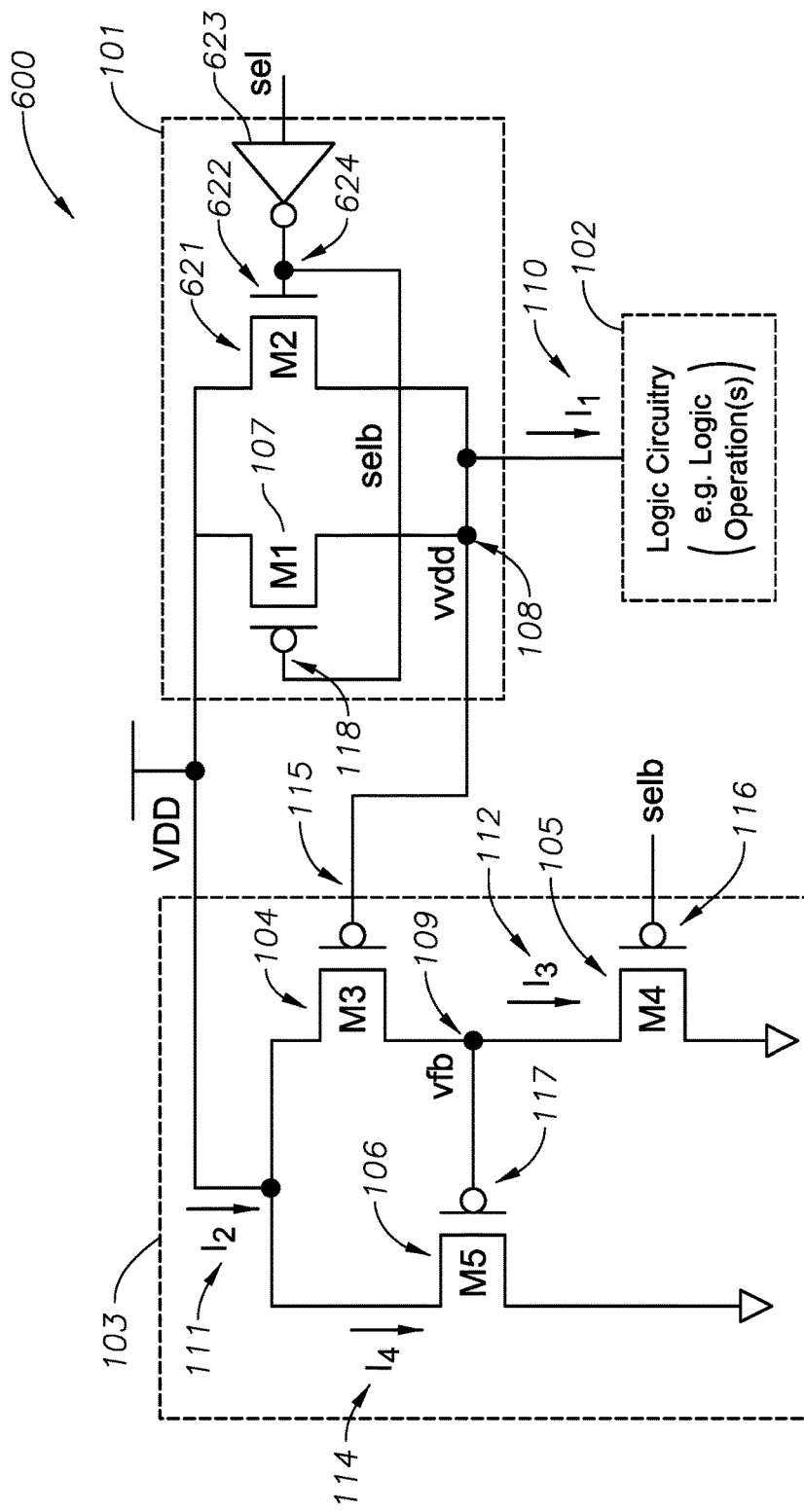
FIG. 6 is a circuit diagram schematically illustrating an apparatus for obfuscating power consumption of a processor in accordance with yet another embodiment described herein.

Referring to FIG. 6, a circuit diagram schematically illustrating another design of an apparatus for obfuscating the power consumption associated with logic circuitry of a processor is shown and generally designated 600. The apparatus 600 may be substantially similar to the apparatus 100 of FIG. 1 but may include and/or omit other components. For example, in contrast to the apparatus 100 of FIG. 1, the apparatus 600 may comprise a header circuitry 101 that includes an NMOS transistor 621 (e.g., transistor M2) and an inverter 623. The NMOS transistor 621 may be connected in parallel with a first PMOS transistor 107 (e.g., transistor M1) to a first reference voltage supply (e.g., VDD) and to the logic circuitry 102 via the common node 108 (vvdd). The NMOS transistor 621 may have a gate terminal 622 connected to a gate terminal 118 of the first PMOS transistor 107 at a header node 624. The inverter 623 may be connected to the header node 624 and may be configured to receive, as an input, a selection (sel) signal from control circuitry (not shown). The inverter 623 may provide a selection bar (selb) signal at the header node 624. The selb signal may be an inverse signal of the sel signal. The NMOS transistor 621 and the first PMOS transistor 107 may be configured to receive the selb signal at their respective gate terminals (e.g., gates 624 and 118, respectively).

The apparatus 600 may operate in a manner substantially similar to that of the apparatus 100 of FIG. 1 but may include and/or omit other operations. For example, the apparatus 600 may be configured to operate in a retention mode associated with the processor. To illustrate a particular embodiment, during operation, a gate terminal 116 of a third PMOS transistor 105 of the counterbalance circuitry 103 may receive the selb signal from control circuitry (not shown). The gate terminal 118 of the first PMOS transistor 107 and the gate terminal 622 of the NMOS transistor 621 may both receive the selb signal via the header node 624. The selb signal may provide a logical value of 1 (e.g., a corresponding "high" voltage value such VDD voltage, a voltage greater than a threshold voltage, etc.) to the transistors 105, 107, and 621 to enable the transistors 105 and 107 to be substantially "off" and to enable the transistor 621 to be substantially "on". In another embodiment, the third PMOS transistor 105 may be controlled by a second selection bar (selb2) signal that is different from the selb signal. The selb2 signal may be associated with timing control of the third PMOS transistor 105 that may be independent of the control of the header circuitry 101.

For the case utilizing the selb signal, in contrast to the apparatus 100 of FIG. 1, the active NMOS transistor 621 may enable the common node 108 (vvdd) to have a voltage sufficient for particular components of the logic circuitry to maintain a logic state. To illustrate, for one or more instances, the logic circuitry 102 may not require obfuscation of its power consumption (e.g., a non-DPA mode of the processor) but the logic circuitry 102 may include components (e.g., storage/memory components) that require a voltage for maintaining/retaining a logic state. The active NMOS transistor 621 of the header circuitry 101 may enable a voltage at the common node 108 for such retention purposes. In this manner, a retention mode for the logic circuitry 102 may be provided. Accordingly, although the obscuring of the power consumption of the logic circuitry 102 may be unnecessary (e.g., a non-DPA mode of the processor) with a corresponding inactive counterbalance circuitry 103 (e.g., no counterbalancing performed), logic state components (e.g., storage/memory components) of the logic circuitry 102 may maintain their logic states during the retention mode provided by the apparatus 600.

In a particular embodiment, the retention mode of the apparatus 600 may be part of a "sleep" mode of operation associated with the logic circuitry 102 or associated processor. In another embodiment, the retention mode of the apparatus 600 may enable faster "wake-up" times for the logic circuitry 102 and associated processor. For example, by providing a voltage (e.g., at the common node 108) sufficient to maintain a logic state for particular components of the logic circuitry 102 (i.e., the retention mode of the apparatus 600), logic circuitry components (e.g., storage/memory units) may have a voltage nearer to a "wake-up" (e.g., active) voltage. Accordingly, the retention mode of the apparatus 600 may enable the logic circuitry components to reach a "wake-up" (e.g., active) voltage in less time.

Figure 7:
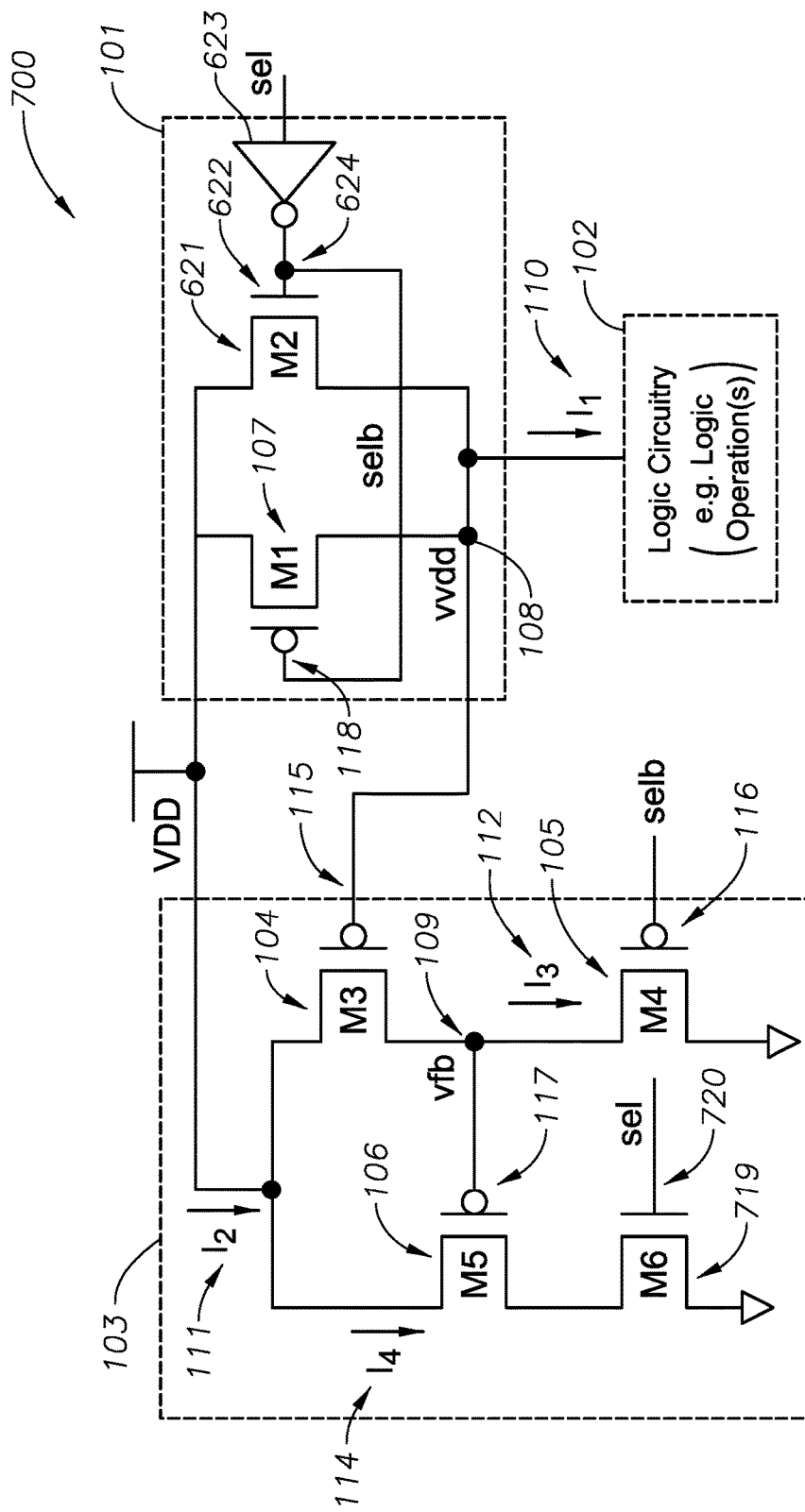
FIG. 7 is a circuit diagram schematically illustrating an apparatus for obfuscating power consumption of a processor in accordance with yet another embodiment described herein.

Referring to FIG. 7, a circuit diagram schematically illustrating another design of an apparatus for obfuscating the power consumption associated with logic circuitry of a processor is shown and generally designated 700. The apparatus 700 may be substantially similar to the apparatus 100 of FIG. 1, the apparatus 200 of FIG. 2 and/or the apparatus 600 of FIG. 6 but may include and/or omit other components. For example, in contrast to the apparatus 600 of FIG. 6, the apparatus 700 may have a counterbalance circuitry 103 that includes a second NMOS transistor 719 (e.g., transistor M6). The second NMOS transistor 719 may be connected to a fourth PMOS transistor 106 (e.g., transistor M5) of the counterbalance circuitry 103 and may be connected to a second reference voltage supply (e.g., ground, or VSS). The second NMOS transistor 719 may have a gate terminal 720 configured receive a selection (sel) signal from control circuitry (not shown).

The apparatus 700 may operate in a manner substantially similar to the apparatus 200 of FIG. 2 and/or the apparatus 600 of FIG. 6. For example, in contrast to the apparatus 600 of FIG. 6, the apparatus 700 may be configured to operate in a retention mode, but may also be configured to operate in a low-power mode associated with the processor, in a similar manner as the low-power mode of the apparatus 200 of FIG. 2. To illustrate a particular embodiment, during operation, a gate terminal 118 of the first PMOS transistor 107 and the gate terminal 622 of the first NMOS transistor 621 may both receive the selb signal via the header node 624. A gate terminal 116 of a third PMOS transistor 105 of the counterbalance circuitry 103 may receive the selb signal from control circuitry (not shown). In a particular embodiment, the third PMOS transistor 105 may be controlled by a second selection bar (selb2) signal that is different from the selb signal. The selb2 signal may be associated with timing control of the third PMOS transistor 105 that may be independent of the control of the header circuitry 101.

The selb signal may be an inverse signal of a selection (sel) signal and may provide a logical value of 1 (e.g., a corresponding "high" voltage value such VDD voltage, a voltage greater than a threshold voltage, etc.) to the transistors 105, 107, and 621. Accordingly, the first PMOS transistor 107, and the third PMOS transistor 105 may each be substantially "off" while the first NMOS transistor 621 may be substantially "on." In this way, the apparatus 700 may provide a retention mode for the logic circuitry 102 that operates in a manner similar to the retention mode of the apparatus 600 of FIG. 6.

The second NMOS transistor 719 may have a gate terminal 720 configured receive the sel signal from the control circuitry. In another embodiment, the second NMOS transistor 719 may be controlled by a second selection bar (selb2) signal that is different from the sel signal. The sel signal may provide a logical value of 0 corresponding "low" voltage value (e.g., a voltage value corresponding to ground, VSS, or low voltage source of a process technology) to the gate terminal 720 of the first NMOS transistor 219. Accordingly, the second NMOS transistor 719 may be substantially "off." In this case, having the second NMOS transistor 719 in an "off" state may prevent the fourth PMOS transistor 106 from leaking current to a ground terminal. In this manner, less power is consumed by the counterbalance circuitry 103 which may correspond to the apparatus 700 operating in a low-power mode associated with the processor.

Accordingly, the apparatus 700 may provide for the obfuscation of the power consumption associated with the logic circuitry 102, may also provide a retention mode operation for the logic circuitry 102, and may also provide a means for preventing current leakage with the use of a low-power mode associated with the logic circuitry 102 and associated processor. The low-power mode may be associated with instances where logic operations are not performed and/or undesired monitoring/analysis of the processor is not a concern (e.g., a non-DPA mode of operation). The retention mode may be part of a "sleep" mode of operation associated with the logic circuitry 102 or associated processor.

Figure 8:
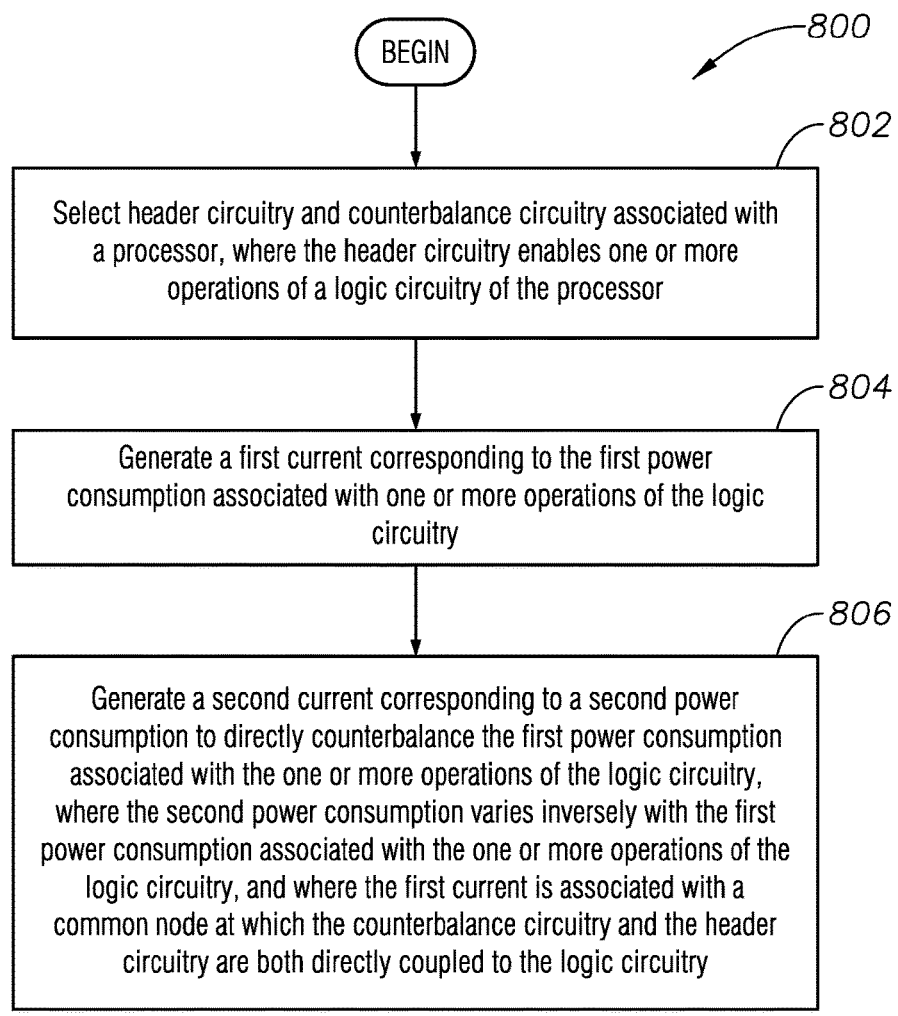
FIG. 8 is a flow chart that illustrates an embodiment of a method for obfuscating power consumption associated with logic circuitry of a processor.

Referring to FIG. 8, a flow chart that illustrates a particular embodiment of a method for obfuscating power consumption associated with one or more operations of a logic circuitry of a processor is shown and generally designated 800. The method 800 includes selecting header circuitry and the counterbalance circuitry associated with the processor at 802. For example, control circuitry may provide selection signals (e.g., selb, sel, and/or selb2 signals) to header circuitry and counterbalance circuitry (e.g., header circuitry 101 and counterbalance circuitry 103) of an apparatus (e.g., such as the apparatuses 100, 200, 300, 600, and 700 of FIGS. 1-3, 6 and 7). The header circuitry may enable one or more operations of a logic circuitry (e.g., such as the logic circuitry 102 of the aforementioned apparatuses). The selection signals may activate/deactivate the header circuitry and counterbalance circuitry in order to provide, among other operations, the obfuscation of power consumption associated with one or more operations of the logic circuitry of a processor.

The method 800 also includes generating a first current corresponding to the power consumption (e.g., a first power consumption) associated with the one or more operations of the logic circuitry, at 804. For example, the header circuitry may receive a selb signal having logical value of 0 that corresponds to a "low" voltage value (e.g., a ground, VSS, or low voltage value) that may be part of activating the header circuitry (e.g., header circuitry 101) to be substantially "on." Such activation of the header circuitry may enable the generation of a first current (e.g., the current 110 of the apparatuses described herein) that corresponds to the operation of one or more functional blocks of a logic circuitry (e.g., the logic circuitry 102 of the apparatuses described herein).

The method 800 also includes generating a second current corresponding to a second power consumption to directly counterbalance the power consumption associated with the one or more operations of the logic circuitry, where the second power consumption varies inversely with the power consumption associated with the one or more operations of the logic circuitry, and where the first current is associated with a common node at which the counterbalance circuitry and the header circuitry are both coupled to the logic circuitry, at 806. For example, a counterbalance circuitry (e.g., the counterbalance circuitry 103 of the apparatuses described herein) may receive a selb signal having logical value of 0 that corresponds to a "low" voltage value (e.g., a ground, VSS, or low voltage value) that may be part of activating the counterbalance circuitry. Such activation of the counterbalance circuitry may enable the generation of a second current (e.g., the current 114 of the apparatuses described herein) that corresponds to a second power consumption. The generated second power consumption may be used to directly counterbalance the power consumption associated with the operation of one or more functional blocks of a logic circuitry (e.g., the logic circuitry 102 of the apparatuses described herein).

The second power consumption generated by the method 800 may vary inversely with the power consumption associated with the one or more operations of the logic circuitry. For example, in a non-limiting example, if the logic circuitry performs one or more logical operations that corresponds to a power consumption that is, for example, one-fourth the maximum power consumption available, the counterbalance circuitry may provide a second power consumption (via an associated current drain) that may be three-fourths the maximum power consumption available. In this manner, the counterbalance circuitry may provide a second power consumption that varies inversely with a power consumption associated with logical operations performed by the logic circuitry. It is to be understood that the counterbalance circuitry may also provide other inverse values of power consumption within a range of a maximum power consumption that is available.

The first current may be associated with a common node at which the counterbalance circuitry and the header circuitry are both coupled to the logic circuitry. For example, the first current generated by the header circuitry may be part of a common node (e.g., the common node 108 (vvdd) of the apparatuses described herein). This common node may be a node at which the counterbalance circuitry and the header circuitry (e.g., the counterbalance circuitry 103, the header circuitry 101 of the apparatuses described herein) are both connected to the logic circuitry (e.g., the logic circuitry 102 of the apparatuses described herein). Such a connection between the counterbalance circuitry and the logic circuitry may provide for a more accurate counterbalancing of the power consumption associated with one or more operations of the logic circuitry.

The method 800 may incorporate the operations and characteristics described for the apparatuses 100, 200, 300, 600, and/or 700 of FIGS. 1, 2, 3, 6, and 7, respectively. For example, transistors (e.g., the second PMOS transistor 104 and the fourth PMOS transistor 106) of the counterbalance circuitry 103 may be sized based on different factors to enable generation of a second power consumption to counterbalance the power consumption associated with operations of a logic circuitry 102. In a non-limiting example, transistors of the counterbalance circuitry 103 may be sized based on power consumption estimates for one or more functional blocks of the logic circuitry 102. Alternatively or in addition, transistors may be configured to have different threshold voltage values. The method 800 may incorporate the various modes of operation of the apparatuses described herein such as, but not limited to, a secure mode, low-power mode, retention mode, or other modes of operation of a processor.

Figure 9:
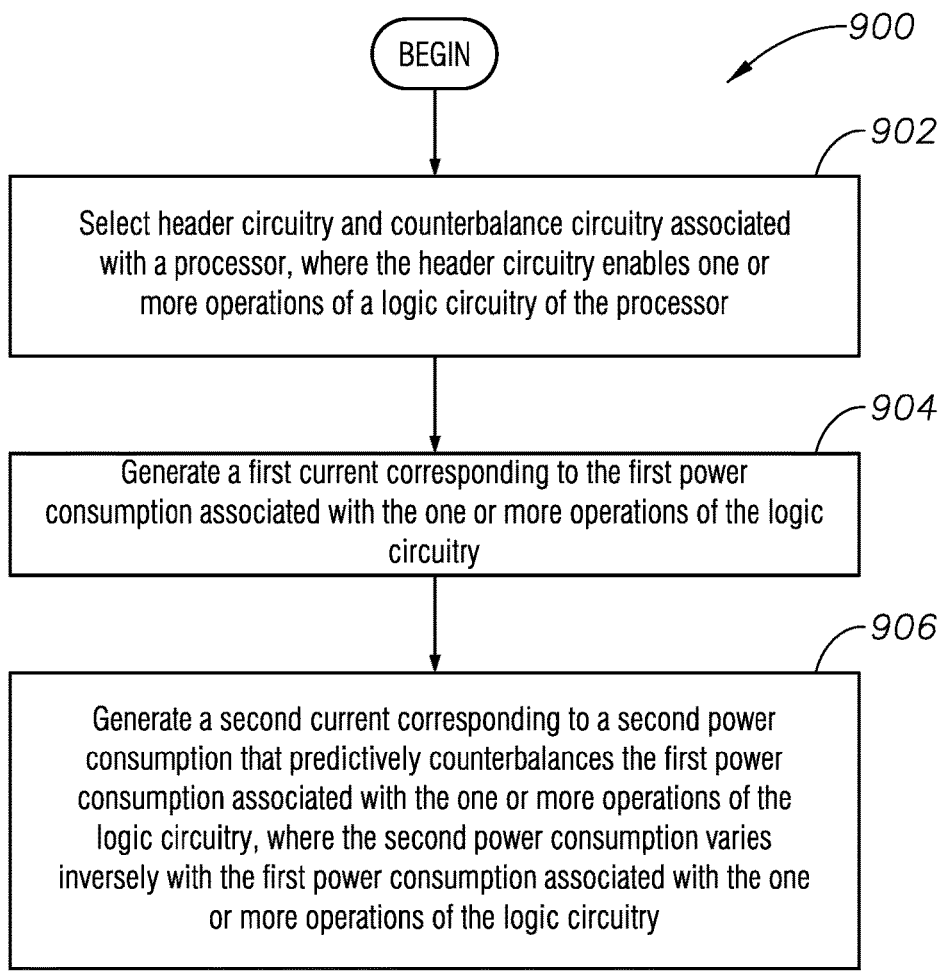
FIG. 9 is a flow chart that illustrates another embodiment of a method for obfuscating power consumption associated with logic circuitry of a processor.

Referring to FIG. 9, a flow chart that illustrates a particular embodiment of a method for obfuscating power consumption associated with one or more operations of a logic circuitry of a processor is shown and generally designated 900. The method 900 includes selecting header circuitry and counterbalance circuitry associated with the processor at 902. For example, control circuitry may provide selection signals (e.g., selb, selb2, and/or selb3 signals) to header circuitry and counterbalance circuitry (e.g., header circuitry 101 and counterbalance circuitry 103) of an apparatus (e.g., such as the apparatus 400 of FIG. 4, and/or the apparatus 500 of FIG. 5). The header circuitry may enable one or more operations of a logic circuitry (e.g., such as the logic circuitry 102 of the aforementioned apparatuses). The selection signals may activate/deactivate the header circuitry and counterbalance circuitry in order to provide, among other operations, the obfuscation of power consumption associated with one or more operations of the logic circuitry of a processor.

The method 900 also includes generating a first current corresponding to the power consumption (e.g., a first power consumption) associated with the one or more operations of the logic circuitry, at 904. For example, the header circuitry may receive a selb signal having logical value of 0 that corresponds to a "low" voltage value (e.g., a ground, VSS, or low voltage value) that may be part of activating the header circuitry (e.g., header circuitry 101 of the apparatuses 400 and/or 500 of FIGS. 4 and 5, respectively) to be substantially "on." Such activation of the header circuitry may enable the generation of a first current (e.g., the current 110) that corresponds to the operation of one or more functional blocks of a logic circuitry (e.g., the logic circuitry 102 of the apparatuses 400 and/or 500 of FIGS. 4 and 5, respectively).

The method 900 also includes generating a second current corresponding to a second power consumption that predictively counterbalances the power consumption associated with the one or more operations of the logic circuitry, where the second power consumption varies inversely with the power consumption associated with the one or more operations of the logic circuitry, at 906. For example, a counterbalance circuitry (e.g., the counterbalance circuitry 103 of the apparatuses 400 and/or 500 of FIGS. 4 and 5, respectively) may receive a selb signal having logical value of 0 that corresponds to a "low" voltage value (e.g., a ground, VSS, or low voltage value) that may be part of activating the counterbalance circuitry 103. Such activation of the counterbalance circuitry 103 may enable the generation of a second current (e.g., the current 114) that corresponds to a second power consumption. The generated second power consumption may be used to predictively counterbalance the power consumption associated with the operation of one or more functional blocks of the logic circuitry. The second power consumption generated by the method 900 may vary inversely with the power consumption associated with the one or more operations of the logic circuitry. It is to be understood that the counterbalance circuitry 103 of the method 900 may provide other inverse values of power consumption within a range of a maximum power consumption that is available.

The method 900 may incorporate the operations and characteristics described for the apparatuses 400 and/or 500 of FIGS. 4 and 5, respectively. For example, transistors (e.g., the second PMOS transistor 104 and the fourth PMOS transistor 106) of the counterbalance circuitry 103 may be sized based on different factors to enable generation of a second power consumption that may predictively counterbalance the power consumption associated with operations of a logic circuitry 102. In a non-limiting example, transistors of the counterbalance circuitry 103 may be sized based on power consumption estimates for one or more functional blocks of the logic circuitry 102. Alternatively or in addition, transistors may be configured to have different threshold voltage values. The method 900 may incorporate the various modes of operation of the apparatuses described herein such as, but not limited to, a secure mode, low-power mode, retention mode, or other modes of operation of a processor.

The method 900 may incorporate the timing and control characteristics described for the apparatuses 400 and/or 500 of FIGS. 4 and 5, respectively. For example, selection signals (e.g., selb, selb2 and/or selb3 signals) may be used as part of the method 900 to control the apparatus (e.g., apparatuses 400 and/or 500) so as to provide a power consumption for predictive counterbalancing prior to or concurrently with performance of the operations/instruction of the logic circuitry 102. Alternatively or in addition, the method 900 may incorporate control circuitry associated with the apparatus 400 and/or 500 to enable the adjustment of selection signal timing based on pipeline operations/instructions yet to be performed so as to affect the timing of providing the counterbalancing power consumption. Such control of the counterbalancing of the power consumption associated with the logic circuitry 102, may improve processor performance during the obfuscation of power consumption associated with encryption or non-encryption operations/instructions of logic circuitry.

Figure 10:
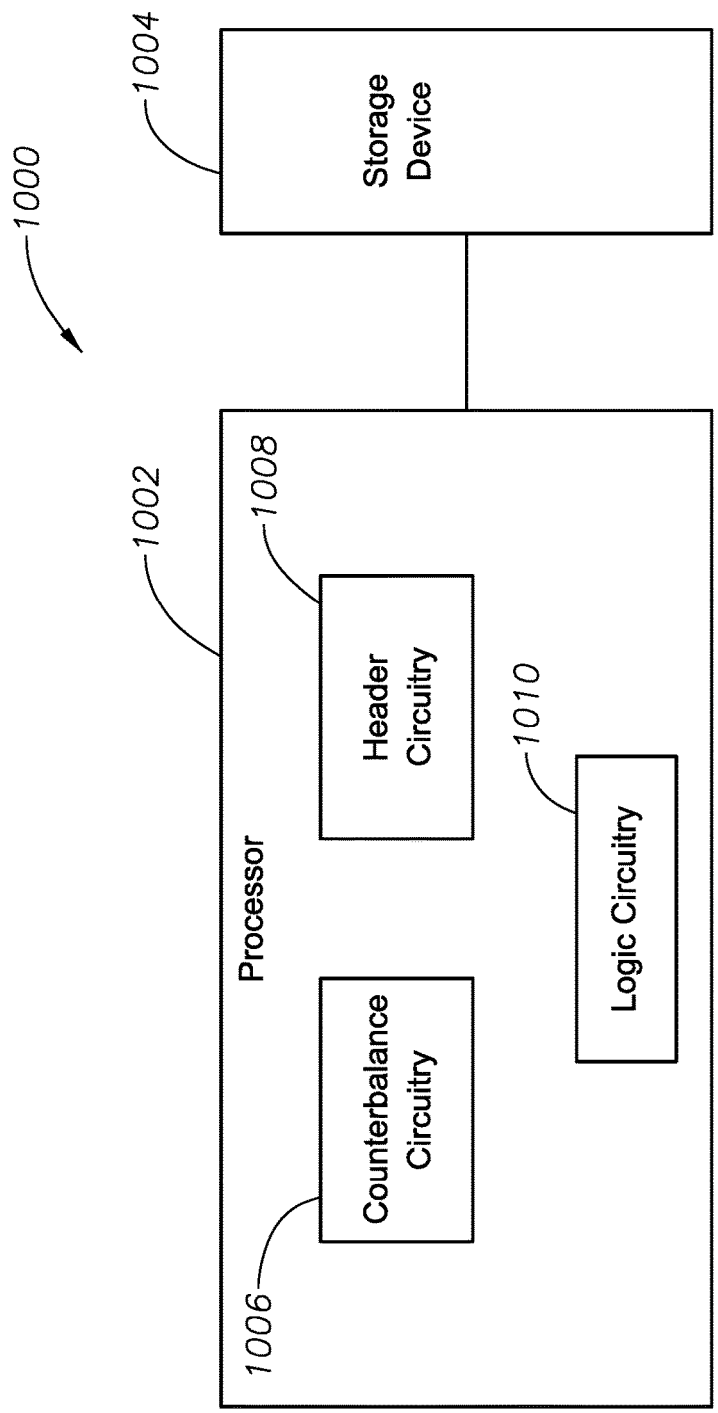
FIG. 10 is a block diagram schematically illustrating a system in accordance with the present techniques, apparatuses, and methods described herein.

Referring to FIG. 10, a block diagram schematically illustrating a system in accordance with apparatuses, methods, and techniques described herein is shown and generally designated 1000. The system 1000 may obfuscate a power consumption associated with one or more operations of a logic circuitry. The system 1000 includes a processor 1002 that comprises a counterbalance circuitry 1006, a header circuitry 1008, and a logic circuitry 1010. The system 1000 may also include a storage device 1004. In a particular embodiment, the storage device 1004 may be included within the processor 1002. The counterbalance circuitry 1006 and the header circuitry 1008 may enable the obfuscation of a power consumption associated with one or more operations of the logic circuitry 1010. The system 1000 may perform the method 800 of FIG. 8 and/or the method 900 of FIG. 9, as well as the operations, modes, or techniques associated with the apparatuses described herein.

The counterbalance circuitry 1006 may be configured to provide a second power consumption to directly counterbalance the power consumption associated with the one or more logic operations performed by the logic circuitry 1010. For example, the system 1000 may utilize the apparatuses of FIGS. 1-3 and 6-7 and their respective counterbalance circuitry 103 to provide the second power consumption for counterbalancing the power consumption associated with the logic circuitry 1010. The second power consumption may vary inversely with the power consumption associated with the one or more operations of the logic circuitry.

In another embodiment, the counterbalance circuitry 1006 may be configured to provide a second power consumption to predictively counterbalance the power consumption associated with the one or more logic operations performed by the logic circuitry 1010. For example, the system 1000 may utilize the apparatuses of FIGS. 4 and 5 and their respective counterbalance circuitry 103 to provide the second power consumption for predictively counterbalancing the power consumption associated with the logic circuitry 1010. The second power consumption may vary inversely with the power consumption associated with the one or more operations of the logic circuitry.

The header circuitry 1008 may be configured to enable a common node to have a voltage that may vary in correspondence to one or more logic operations performed by the logic circuitry 1010 of the processor 1002. The header circuitry 1008 and the counterbalance circuitry 1006 may each be coupled to the logic circuit 1010 at the common node. For example, the system 1000 may utilize the apparatuses of FIGS. 1-3 and 6-7 and their respective header circuitry 101 to enable a common node voltage to vary in correspondence with the operations of the logic circuitry 1010. In another embodiment, the header circuitry 1008 may be configured to enable the one or more operations of the logic circuit 1010. The header circuitry 1008 and the counterbalance circuitry 1006 may be configured to receive a selection signal (e.g., selb). For example, the system 1000 may utilize the apparatuses of FIGS. 4 and 5 and their respective header circuitry 101 to enable the one or more operations of the logic circuit 1010.

The logic circuitry 1010 may have a power consumption resulting from one or more associated functional blocks or logic operations/instructions which may include, but are not limited to, any number of processor operations (e.g., data processing, arithmetic, and/or logical operations). Logic operations of the logic circuitry 1010 may correspond to one or more pipeline steps carried out by the processor 1002, one or more stages of a cryptographic algorithm, one or more "keyed" cryptographic steps, or cryptographic algorithms associated with one or more encryption standards (e.g., AES, DES, or RSA standards). The power consumption associated with the logic circuitry 1010 may be counterbalanced by the counterbalance circuitry 1006 and the header circuitry 1008 to enable obfuscation of a power consumption associated with one or more operations of the logic circuitry 1010.

The storage device 1004 may store and provide access to power consumption information (e.g., power consumption estimates) for one or more instructions associated with one or more operations that may be performed by the logic circuitry 1010. For example, the logic circuitry 1010 may access the storage device 1004 to retrieve the one or more instructions stored. Components (e.g., functional blocks) of the logic circuitry 1010 may execute the one or more instructions in order to perform the one or more operations associated with the logic circuitry 1010. The instructions stored and accessible from the storage device 1004 may include instructions related to any number of processor operations, such as, data processing, arithmetic, and/or logical operations, pipeline operations, cryptographic operations, or operations associated with one or more encryption standards (e.g., AES, DES, or RSA standards). The storage device 1004 may be in the form of volatile memory (e.g., SRAM, DRAM or other future volatile memory types) or non-volatile memory (e.g., ROM, EPROM, EEPROM MRAM, or other future non-volatile memory types). The storage device 1004 may be separate from the processor 1002 or may be integrated with the processor 1002 (e.g., as cache memory of the processor).

The system 1000 may incorporate the operations and characteristics of the apparatuses described herein (e.g., apparatuses 100-700 of FIGS. 1-7, respectively). For example, the counterbalance circuitry 1006 may have transistors (e.g., the second PMOS transistor 104 and the fourth PMOS transistor 106) that are sized based on different factors to enable generation of a second power consumption to counterbalance the power consumption associated with operations of a logic circuitry 1010. Transistors of the counterbalance circuitry 1006 may have different threshold voltage values or may be sized based on power consumption estimates for one or more functional blocks of the logic circuitry 1010. The system 1000 may incorporate the various modes of operation of the apparatuses described herein such as, a secure mode, low-power mode, retention mode, or other modes of operation of a processor. Furthermore, components of the system 1000 may be configured to enable control of timing and activation of the second power consumption for counterbalancing (e.g., power consumption obfuscation) of the power consumption associated with the logic circuitry 1010.

The system 1000 may operate to provide a second power consumption that would act to obscure the total power consumption of the logic circuitry 1010 that is associated with the processor 1002. The obfuscation of power consumption provided by the system 1000 may counteract the undesired monitoring/analysis (e.g., a DPA attack) of the processor 1002, its associated operations/instructions and corresponding power consumption. Such obfuscation of the power consumption associated with logic circuitry 1010 may provide improvements in the security and integrity of data, instructions, and/or operations (e.g., cryptographic and/or other operations) that are processed by components of the processor 1002.

Figure 11:
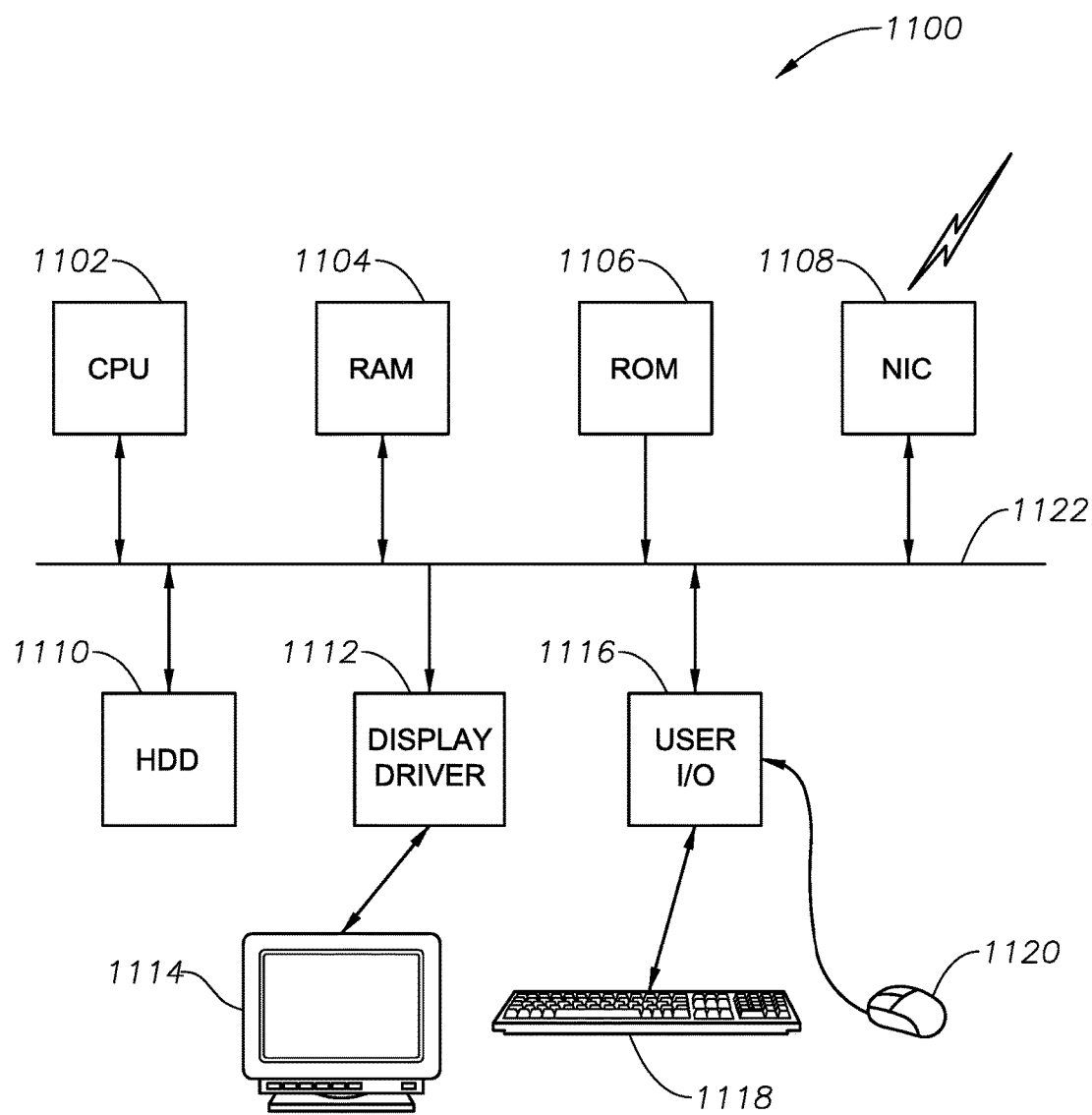
FIG. 11 illustrates a block diagram of a computer system in accordance with implementations of the present techniques, apparatuses, systems, and methods described herein.

Referring to FIG. 11, a block diagram schematically illustrating a general purpose computer of the type that may be used to implement the above described apparatuses, methods and techniques is shown and generally designated 1100. The general purpose computer 1100 includes a central processing unit 1102, a random access memory 1104, a read-only memory 1106, a network interface card 1108, a hard disk drive 1110, a display driver 1112, a user input/output circuit 1116 with a keyboard 1118 and mouse 1120, and a monitor 1114 all connected via a common bus 1122.

In operation the central processing unit 1102 will execute computer program instructions that may be stored in one or more of the random access memory 1104, the read-only memory 1106 and the hard disk drive 1110, or dynamically downloaded via the network interface card 1008. The results of the processing performed may be displayed to a user via the display driver 1112 and the monitor 1114. User inputs for controlling the operation of the general purpose computer 1100 may be received via the user input/output circuit 1116 from the keyboard 1118 or the mouse 1120. It will be appreciated that the computer program could be written in a variety of different computer languages. The computer program may be stored and distributed on a recording medium or dynamically downloaded to the general purpose computer 1100.

When operating under control of an appropriate computer program, the general purpose computer 1100 can include the above described apparatuses (e.g., the apparatuses 100-700 FIGS. 1-7, respectively) and perform the above described methods and techniques (e.g., the methods 800 and/or 900 of FIGS. 8 and 9, respectively) and can be considered to form a particular apparatus for performing the above described methods and techniques. For example, the particular apparatus may include the system 1000 of FIG. 10 or one or more components of the system 1000 of FIG. 10. The architecture of the general purpose computer 1100 could vary considerably, and FIG. 11 is only one example Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. An apparatus for obfuscating a first power consumption associated with one or more operations of a logic circuitry of a processor, the apparatus comprising:

counterbalance circuitry configured to provide a second power consumption to directly counterbalance the first power consumption associated with the one or more operations of the logic circuitry, wherein the second power consumption varies inversely with the first power consumption associated with the one or more operations of the logic circuitry; and header circuitry configured to enable a common node to vary in voltage corresponding to the one or more operations of the logic circuitry;

wherein the counterbalance circuitry and the header circuitry are each coupled to the logic circuitry at the common node, wherein the header circuitry comprises a first PMOS transistor connected between a first reference voltage supply and the common node, and wherein a gate of the first PMOS transistor is configured to receive a selection signal, wherein the first PMOS transistor is configured to have a threshold voltage that is greater than a threshold voltage of at least one PMOS transistor of the counterbalance circuitry.

2. An apparatus for obfuscating a first power consumption associated with one or more operations of a logic circuitry of a processor, the apparatus comprising:

counterbalance circuitry configured to provide a second power consumption to directly counterbalance the first power consumption associated with the one or more operations of the logic circuitry, wherein the second power consumption varies inversely with the first power consumption associated with the one or more operations of the logic circuitry; and header circuitry configured to enable a common node to vary in voltage corresponding to the one or more operations of the logic circuitry;

wherein the counterbalance circuitry and the header circuitry are each coupled to the logic circuitry at the common node, wherein the counterbalance circuitry comprises:
 a second PMOS transistor connected between a first reference voltage supply and a first node;
 a third PMOS transistor connected between the first node and a second reference voltage supply; and
 a fourth PMOS transistor connected between the first reference voltage supply and the second reference voltage supply;
 wherein a gate of the second PMOS transistor is connected to the logic circuitry at the common node, a gate of the third PMOS transistor is configured to receive a selection signal, and a gate of the fourth PMOS transistor is connected to the first node.

3. The apparatus of claim 2, wherein the second PMOS transistor and the fourth PMOS transistor are sized to provide the counterbalancing of the first power consumption associated with the one or more operations of the logic circuitry.

4. The apparatus of claim 3, wherein the second PMOS transistor and the fourth PMOS transistor are associated with a standard cell library of a process technology.

5. The apparatus of claim 2, wherein the second PMOS transistor and the fourth PMOS transistor are configured to have a low threshold voltage.

6. The apparatus of claim 2, wherein the third PMOS transistor is configured to have a threshold voltage that is greater than a threshold voltage of the second PMOS transistor and a threshold voltage of the fourth PMOS transistor, and wherein a first PMOS transistor of the header circuitry is configured to have a threshold voltage that is the same as the threshold voltage of the third PMOS transistor.

7. The apparatus of claim 2, wherein a size of the second PMOS transistor and a size of the third PMOS transistor has a ratio of 3 to 1.

8. The apparatus of claim 2, wherein a size of the fourth PMOS transistor and a size of a first PMOS transistor of the header circuitry has a ratio of 1.5 to 1.

9. The apparatus of claim 1, wherein the counterbalance circuitry and the header circuitry are controlled by a common selection signal.

10. The apparatus of claim 1, wherein the header circuitry is controlled by a first selection signal and the counterbalance circuitry is controlled by a second selection signal that is different from the first selection signal.

11. An apparatus for obfuscating a first power consumption associated with one or more operations of a logic circuitry of a processor, the apparatus comprising:
 counterbalance circuitry configured to provide a second power consumption to directly counterbalance the first power consumption associated with the one or more operations of the logic circuitry, wherein the second power consumption varies inversely with the first power consumption associated with the one or more operations of the logic circuitry; and
 header circuitry configured to enable a common node to vary in voltage corresponding to the one or more operations of the logic circuitry;
 wherein the counterbalance circuitry and the header circuitry are each coupled to the logic circuitry at the common node, wherein the counterbalance circuitry comprises:
  a second PMOS transistor connected between a first reference voltage supply and a first node;
  a fourth PMOS transistor connected between the first reference voltage supply and a second reference voltage supply; and
  a plurality of PMOS transistors connected in parallel between the first node and the second reference voltage;
  wherein a gate of the second PMOS transistor is connected to the logic circuitry at the common node and a gate of the fourth PMOS transistor is connected to the first node, and wherein a plurality of second selection signals control the plurality of PMOS transistors.

12. The apparatus of claim 11, wherein control of the plurality of PMOS transistors by the plurality of second selection signals enables increased accuracy of the counterbalance circuitry for counterbalancing of the first power consumption associated with the one or more operations of the logic circuitry.

13. The apparatus of claim 11, wherein the operations of the logic circuitry correspond to one or more pipeline steps of the processor.

14. The apparatus of claim 11, wherein the operations of the logic circuitry correspond to one or more stages of a cryptographic algorithm.

15. The apparatus of claim 14, wherein the cryptographic algorithm is associated with one or more encryption standards.

16. An apparatus for obfuscating a first power consumption associated with one or more operations of a logic circuitry of a processor, the apparatus comprising:
 counterbalance circuitry configured to provide a second power consumption to predictively counterbalance the first power consumption associated with the one or more operations of the logic circuitry, wherein the second power consumption varies inversely with the first power consumption associated with the one or more operations of the logic circuitry; and
 header circuitry configured to enable the one or more operations of the logic circuitry, wherein the header circuitry and the counterbalance circuitry are configured to receive a selection signal,
 wherein the counterbalance circuitry comprises a second PMOS transistor, a third PMOS transistor, and a fourth PMOS transistor, and wherein the second PMOS transistor, the third PMOS transistor, and the fourth PMOS transistor are sized based on estimates of the first power consumption.

17. An apparatus for obfuscating a first power consumption associated with one or more operations of a logic circuitry of a processor, the apparatus comprising:
 counterbalance circuitry configured to provide a second power consumption to predictively counterbalance the first power consumption associated with the one or more operations of the logic circuitry, wherein the second power consumption varies inversely with the first power consumption associated with the one or more operations of the logic circuitry; and header circuitry configured to enable the one or more operations of the logic circuitry, wherein the header circuitry and the counterbalance circuitry are configured to receive a selection signal, wherein the counterbalance circuitry comprises a plurality of sub-counterbalance circuits connected in parallel between a first reference voltage supply and a second reference voltage supply, and wherein one or more selection signals activate or de-activate one or more sub-counterbalance circuits of the plurality of sub-counterbalance circuits.

18. The apparatus of claim 17, wherein the activation or de-activation of the one or more sub-counterbalance circuits determines the second power consumption generated for the predictive counterbalancing of the first power consumption.

19. A system for obfuscating a first power consumption associated with one or more operations of a logic circuitry, the system comprising:

a processor comprising:
 the logic circuitry;
  a counterbalance circuitry configured to provide a second power consumption to predictively counterbalance the first power consumption associated with the one or more operations of the logic circuitry, wherein the second power consumption varies inversely with the first power consumption associated with the one or more operations of the logic circuitry; and
 a header circuitry configured to enable the one or more operations of the logic circuitry, wherein the header circuitry and the counterbalance circuitry are configured to receive a selection signal; and
a storage device for storing one or more instructions associated with the one or more operations of the logic circuitry, wherein the counterbalance circuitry comprises a plurality of sub-counterbalance circuits connected in parallel between a first reference voltage supply and a second reference voltage supply, and wherein one or more selection signals activate or de-activate one or more sub-counterbalance circuits of the plurality of sub-counterbalance circuits.

* * * * *